US012020713B2

(12) United States Patent
Vasilache

(10) Patent No.: US 12,020,713 B2
(45) Date of Patent: Jun. 25, 2024

(54) QUANTIZATION OF SPATIAL AUDIO DIRECTION PARAMETERS

(71) Applicant: Nokia Technologies Oy, Espoo (FI)

(72) Inventor: Adriana Vasilache, Tampere (FI)

(73) Assignee: Nokia Technologies Oy, Espoo (FI)

( * ) Notice: Subject to any disclaimer, the term of this patent is extended or adjusted under 35 U.S.C. 154(b) by 363 days.

(21) Appl. No.: 17/635,593

(22) PCT Filed: Jul. 27, 2020

(86) PCT No.: PCT/FI2020/050507
§ 371 (c)(1),
(2) Date: Feb. 15, 2022

(87) PCT Pub. No.: WO2021/032909
PCT Pub. Date: Feb. 25, 2021

(65) Prior Publication Data

US 2022/0335956 A1 Oct. 20, 2022

(30) Foreign Application Priority Data

Aug. 16, 2019 (GB) .................................... 1911807

(51) Int. Cl.
*G10L 19/008* (2013.01)
*G10L 19/00* (2013.01)
*G10L 19/035* (2013.01)

(52) U.S. Cl.
CPC .......... *G10L 19/008* (2013.01); *G10L 19/035* (2013.01); *G10L 2019/0004* (2013.01)

(58) Field of Classification Search
CPC ................. G10L 19/008; G10L 19/035; G10L 2019/0004
See application file for complete search history.

(56) References Cited

U.S. PATENT DOCUMENTS

2017/0309280 A1 10/2017 Friedrich et al.

FOREIGN PATENT DOCUMENTS

CN 105898669 A 8/2016
CN 106023999 A 10/2016
(Continued)

OTHER PUBLICATIONS

Search Report received for corresponding United Kingdom Patent Application No. 1911807.4, dated Feb. 17, 2020, 3 pages.
(Continued)

*Primary Examiner* — Fan S Tsang
*Assistant Examiner* — David Siegel
(74) *Attorney, Agent, or Firm* — Nokia Technologies Oy

(57) ABSTRACT

A method for spatial audio signal encoding comprising: obtaining, for a first frame, a plurality of audio direction parameters, wherein each parameter comprises an elevation value and an azimuth value and wherein each parameter has an ordered position; determining whether, for a preceding frame, any of the plurality of audio direction parameters was differentially encoded based on a difference between the preceding frame parameter elevation value and a further preceding frame parameter elevation value and the preceding frame parameter azimuth value and a further preceding frame parameter azimuth value; generating, for any audio direction parameter which was not differentially encoded in the considered preceding frame, a differential parameter value based on a difference between the frame parameter elevation value and a preceding frame parameter elevation value and a difference between the frame parameter azimuth value and a preceding frame parameter azimuth value; generating for each of the plurality of audio direction parameters a difference parameter value based on a difference between the audio direction parameter and a rotated derived audio direction parameter; quantizing the difference
(Continued)

between the audio direction parameter and a rotated derived audio direction parameter and the differential parameter value; and selecting for each of the plurality of audio direction parameters, either of the quantized difference or differential parameter value.

20 Claims, 14 Drawing Sheets

(56) References Cited

FOREIGN PATENT DOCUMENTS

| | | | | |
|---|---|---|---|---|
| EP | 2346028 | A1 | 7/2011 | |
| EP | 2830047 | A1 * | 1/2015 | ........... G10L 19/005 |
| EP | 2830047 | A1 | 1/2015 | |
| EP | 2863657 | A1 * | 4/2015 | ........... G10L 19/008 |
| EP | 2863657 | A1 | 4/2015 | |
| GB | 2586214 | A | 2/2021 | |
| GB | 2586461 | A | 2/2021 | |
| WO | 2014/151813 | A1 | 9/2014 | |
| WO | 2019/071149 | A1 | 4/2019 | |
| WO | 2019/097018 | A1 | 5/2019 | |
| WO | 2019/129350 | A1 | 7/2019 | |

OTHER PUBLICATIONS

International Search Report and Written Opinion received for corresponding Patent Cooperation Treaty Application No. PCT/FI2020/050507, dated Nov. 26, 2020, 22 pages.

Extended European Search Report received for corresponding European Patent Application No. 20854517.8, dated Mar. 24, 2023, 10 pages.

Gao et al., "JND-based spatial parameter quantization of multichannel audio signals", EURASIP Journal on Audio, Speech, and Music Processing, Article No. 13, 2016, pp. 1-18.

"Information technology—High efficiency coding and media delivery in heterogeneous environments—Part 3: 3D audio", ISO/IEC JTC1/SC29/WG11, ISO/IEC 23008-3:201xE, Oct. 12, 2016, 799 pages.

* cited by examiner

QUANTIZATION OF SPATIAL AUDIO DIRECTION PARAMETERS

RELATED APPLICATION

This application was originally filed as PCT Application No. PCT/FI2020/050507, filed on Jul. 27, 2020, which claims priority from Great Britain Application No. 1911807.4, filed on Aug. 16, 2019, each of which is incorporated herein by reference in its entirety.

FIELD

The present application relates to apparatus and methods for sound-field related parameter encoding, but not exclusively for direction related parameter encoding for an audio encoder and decoder.

BACKGROUND

Parametric spatial audio processing is a field of audio signal processing where the spatial aspect of the sound is described using a set of parameters. For example, in parametric spatial audio capture from microphone arrays, it is a typical and an effective choice to estimate from the microphone array signals a set of parameters such as directions of the sound in frequency bands, and the ratios between the directional and non-directional parts of the captured sound in frequency bands. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

The directions and direct-to-total energy ratios in frequency bands are thus a parameterization that is particularly effective for spatial audio capture.

A parameter set consisting of a direction parameter in frequency bands and an energy ratio parameter in frequency bands (indicating the directionality of the sound) can be also utilized as the spatial metadata for an audio codec. For example, these parameters can be estimated from microphone-array captured audio signals, and for example a stereo signal can be generated from the microphone array signals to be conveyed with the spatial metadata. The stereo signal could be encoded, for example, with an AAC encoder. A decoder can decode the audio signals into PCM signals, and process the sound in frequency bands (using the spatial metadata) to obtain the spatial output, for example a binaural output.

The aforementioned solution is particularly suitable for encoding captured spatial sound from microphone arrays (e.g., in mobile phones, VR cameras, stand-alone microphone arrays). However, it may be desirable for such an encoder to have also other input types than microphone-array captured signals, for example, loudspeaker signals, audio object signals, or Ambisonic signals.

Analysing first-order Ambisonics (FOA) inputs for spatial metadata extraction has been thoroughly documented in scientific literature related to Directional Audio Coding (DirAC) and Harmonic planewave expansion (Harpex). This is since there exist microphone arrays directly providing a FOA signal (more accurately: its variant, the B-format signal), and analysing such an input has thus been a point of study in the field.

A further input for the encoder is also multi-channel loudspeaker input, such as 5.1 or 7.1 channel surround inputs.

However, with respect to input audio objects types to an encoder there may be accompanying metadata which comprises directional components of each audio object within a physical space. These directional components may comprise an elevation and azimuth of an audio object's position within the space.

SUMMARY

According to a first aspect there is provided a method for spatial audio signal encoding comprising: obtaining, for a first frame, a plurality of audio direction parameters, wherein each parameter comprises an elevation value and an azimuth value and wherein each parameter has an ordered position; determining whether, for a preceding frame, any of the plurality of audio direction parameters was differentially encoded based on a difference between the preceding frame parameter elevation value and a further preceding frame parameter elevation value and the preceding frame parameter azimuth value and a further preceding frame parameter azimuth value; generating, for any audio direction parameter which was not differentially encoded in the considered preceding frame, a differential parameter value based on a difference between the frame parameter elevation value and a preceding frame parameter elevation value and a difference between the frame parameter azimuth value and a preceding frame parameter azimuth value; generating for each of the plurality of audio direction parameters a difference parameter value based on a difference between the audio direction parameter and a rotated derived audio direction parameter; quantizing the difference between the audio direction parameter and a rotated derived audio direction parameter and the differential parameter value; and selecting for each of the plurality of audio direction parameters, either of the quantized difference or differential parameter value.

Generating for each of the plurality of audio direction parameters a difference parameter value based on a difference between the audio direction parameter and a rotated derived audio direction parameter may comprise: deriving for each of the plurality of audio direction parameters a corresponding derived audio direction parameter comprising an elevation and an azimuth value; rotating each derived audio direction parameter by the azimuth value of an audio direction parameter in the first position of the plurality of audio direction parameters and quantizing the rotation to determine for each a corresponding quantized rotated derived audio direction parameter; and changing the ordered position of an audio direction parameter to a further position coinciding with a position of a rotated derived audio direction parameter when the azimuth value of the audio direction parameter is closest to the azimuth value of the further rotated derived audio direction parameter compared to the azimuth values of other rotated derived audio direction parameters; determining for each of the plurality audio direction parameters a difference between each audio direction parameter and their corresponding quantized rotated derived audio direction parameter.

Deriving for each of the plurality of audio direction parameters a corresponding derived audio direction parameter comprising an elevation and an azimuth value may comprise deriving the azimuth value of each derived audio direction parameter corresponds with a position of a plurality of positions around the circumference of a circle.

The plurality of positions around the circumference of the circle may be evenly distributed along one of: 360 degrees of the circle when the spatial utilization defined by the elevation values and the azimuth values of the plurality of audio direction parameters occupy more than a hemisphere; 180 degrees of the circle when the spatial utilization defined by the elevation values and the azimuth values of the plurality of audio direction parameters occupy less than a hemisphere; 90 degrees of the circle when the spatial utilization defined by the elevation values and the azimuth values of the plurality of audio direction parameters occupy less than a quadrant of a sphere; and a defined number of degrees of the circle when the spatial utilization defined by the elevation values and the azimuth values of the plurality of audio direction parameters occupy less than a threshold range of angles of a sphere.

The number of positions around a circumference of the circle may be determined by a determined number of audio direction parameters.

The corresponding derived audio direction parameters may be arranged in a manner determined by a spatial utilization defined by the elevation values and the azimuth values of the plurality of audio direction parameters.

Quantizing the difference between the audio direction parameter and a rotated derived audio direction parameter and the differential parameter value may comprise determining a difference quantization resolution for each of the plurality of audio direction parameters based on a spatial extent of the audio direction parameters.

Determining whether, for a preceding frame, any of the plurality of audio direction parameters were differentially encoded may comprise determining any of the plurality of audio direction parameters were differentially encoded for a determined number of contiguous preceding frames.

Generating, for any audio direction parameter which was not differentially encoded in the preceding frame, a differential parameter value may comprise at least one of: generating an indicator based on determining a difference between the frame parameter elevation value and a preceding frame parameter elevation value is less than a determined elevation difference threshold and a difference between the frame parameter azimuth value and a preceding frame parameter azimuth value is less than a determined azimuth difference threshold; generating an indicator based on determining a difference between the frame parameter elevation value and a preceding frame parameter elevation value is less than a determined elevation difference threshold and a difference between the frame parameter elevation value and a preceding frame parameter elevation value is less than a determined elevation difference threshold; generating, for any audio direction parameter which was not differentially encoded in the considered preceding frame, a differential parameter value based on a difference between the frame parameter elevation value and a preceding frame parameter elevation value and a difference between the frame parameter azimuth value and a preceding frame parameter azimuth value, when a difference between the frame parameter azimuth value and a preceding frame parameter azimuth value is less than a determined azimuth difference threshold; and generating, for any audio direction parameter which was not differentially encoded in the considered preceding frame, a differential parameter value based on a difference between the frame parameter elevation value and a preceding frame parameter elevation value and a difference between the frame parameter azimuth value and a preceding frame parameter azimuth value, when a difference between the frame parameter elevation value and a preceding frame parameter elevation value is less than a determined elevation difference threshold.

Selecting for each of the plurality of audio direction parameters, either of the quantized difference or differential parameter value may be based on a determination of which requires a fewer number of bits to encode where there are both the quantized difference and the differential parameter value for the audio direction parameter and the quantized difference otherwise.

Rotating each derived audio direction parameter by the azimuth value of a first audio direction parameter of the plurality of audio direction parameters may comprise: adding the azimuth value of the first audio direction parameter to the azimuth value of each derived audio direction parameter, wherein the elevation value of each derived audio direction parameter is set to zero.

Quantizing the difference between the audio direction parameter and a rotated derived audio direction parameter and the differential parameter value may further comprise scalar quantising the azimuth value of the first audio direction parameter, and the method may further comprise indexing the positions of the audio direction parameters after the changing by assigning an index to a permutation of indices representing the order of the positions of the audio direction parameters.

Determining for each of the plurality audio direction parameters a difference between each audio direction parameter and their corresponding quantized rotated derived audio direction parameter may further comprise: determining for each of the plurality of audio direction parameters a difference audio direction parameter based on at least: determining a difference between the first positioned audio direction parameter and the first positioned rotated derived audio direction parameter; and/or determining a difference between a further audio direction parameter and a rotated derived audio direction parameter, wherein the position of the further audio direction parameter is unchanged; and/or determining a difference between a yet further audio direction parameter and a rotated derived audio direction parameter wherein the position of the yet further audio direction parameter has been changed to the position of the rotated derived audio direction parameter.

Changing the position of an audio direction parameter to a further position may apply to any audio direction parameter but the first positioned audio direction parameter.

Quantizing the difference between the audio direction parameter and a rotated derived audio direction parameter and the differential parameter value may comprise quantising the difference and the differential parameter value as a vector being indexed to a codebook comprising a plurality of indexed elevation values and indexed azimuth values.

The plurality of indexed elevation values and indexed azimuth values may be points on a grid arranged in a form of a sphere, wherein the spherical grid may be formed by covering the sphere with smaller spheres, wherein the smaller spheres define points of the spherical grid.

According to a second aspect there is provided a method for spatial audio signal decoding comprising: obtaining, for a first frame, a plurality of encoded audio direction parameters and associated signalling; determining whether any of the plurality of encoded audio direction parameters are differentially encoded based on a preceding obtained frame encoded audio direction parameter; decoding the determined differentially encoded audio direction parameters based on associated preceding obtained frame encoded audio direction parameters; decoding the remaining encoded audio direction parameters based on a determined configuration of directional values, of which the configuration is rotated, and at least one directional difference value modifies at least one element thereof; and reordering the differentially decoded and configuration decoded directional values based on the associated signalling.

Decoding the remaining encoded audio direction parameters based on a determined configuration of directional values, of which the configuration is rotated, and at least one directional difference value modifies at least one element thereof may comprise: determining a configuration of directional values based on an encoded space utilization parameter within the associated signalling; determining a rotation angle based on an encoded rotation parameter within the associated signalling; applying the rotation angle to the configuration of directional values to generate a rotated configuration of directional values, the rotated configuration of directional values comprising a first directional value and second and further directional values; determining one or more difference values based on encoded difference values and encoded spatial extent values; and applying the one or more difference values to respective second and further respective directional values to generate modified second and further directional values.

Determining a configuration of directional values based on an encoded space utilization parameter within the associated signalling may comprise deriving the azimuth value of each derived audio direction parameter corresponds with a position of a plurality of positions around the circumference of a circle.

The plurality of positions around the circumference of the circle may be evenly distributed along one of: 360 degrees of the circle when the spatial utilization defined by the elevation values and the azimuth values of the plurality of audio direction parameters occupy more than a hemisphere; 180 degrees of the circle when the spatial utilization defined by the elevation values and the azimuth values of the plurality of audio direction parameters occupy less than a hemisphere; 90 degrees of the circle when the spatial utilization defined by the elevation values and the azimuth values of the plurality of audio direction parameters occupy less than a quadrant of a sphere; and a defined number of degrees of the circle when the spatial utilization defined by the elevation values and the azimuth values of the plurality of audio direction parameters occupy less than a threshold range of angles of a sphere.

The method may further comprise: determining whether any of the plurality of encoded audio direction parameters are differentially encoded and furthermore the preceding frame encoded audio direction parameter is missing; and determining an estimate of the differentially encoded audio direction based on an extrapolation of at least two available preceding frames encoded audio direction parameters or based on the determined configuration of directional values, of which the configuration is rotated, and at least one directional difference value.

According to a third aspect there is provided an apparatus for spatial audio signal encoding comprising means configured to: obtain, for a first frame, a plurality of audio direction parameters, wherein each parameter comprises an elevation value and an azimuth value and wherein each parameter has an ordered position; determine whether, for a preceding frame, any of the plurality of audio direction parameters was differentially encoded based on a difference between the preceding frame parameter elevation value and a further preceding frame parameter elevation value and the preceding frame parameter azimuth value and a further preceding frame parameter azimuth value; generate, for any audio direction parameter which was not differentially encoded in the considered preceding frame, a differential parameter value based on a difference between the frame parameter elevation value and a preceding frame parameter elevation value and a difference between the frame parameter azimuth value and a preceding frame parameter azimuth value; generate for each of the plurality of audio direction parameters a difference parameter value based on a difference between the audio direction parameter and a rotated derived audio direction parameter; quantize the difference between the audio direction parameter and a rotated derived audio direction parameter and the differential parameter value; and select for each of the plurality of audio direction parameters, either of the quantized difference or differential parameter value.

The means configured to generate for each of the plurality of audio direction parameters a difference parameter value based on a difference between the audio direction parameter and a rotated derived audio direction parameter may be configured to: derive for each of the plurality of audio direction parameters a corresponding derived audio direction parameter comprising an elevation and an azimuth value; rotate each derived audio direction parameter by the azimuth value of an audio direction parameter in the first position of the plurality of audio direction parameters and quantize the rotation to determine for each a corresponding quantized rotated derived audio direction parameter; change the ordered position of an audio direction parameter to a further position coinciding with a position of a rotated derived audio direction parameter when the azimuth value of the audio direction parameter is closest to the azimuth value of the further rotated derived audio direction parameter compared to the azimuth values of other rotated derived audio direction parameters; and determine for each of the plurality audio direction parameters a difference between each audio direction parameter and their corresponding quantized rotated derived audio direction parameter.

The means configured to derive for each of the plurality of audio direction parameters a corresponding derived audio direction parameter comprising an elevation and an azimuth value may be configured to derive the azimuth value of each derived audio direction parameter corresponds with a position of a plurality of positions around the circumference of a circle.

The plurality of positions around the circumference of the circle may be evenly distributed along one of: 360 degrees of the circle when the spatial utilization defined by the elevation values and the azimuth values of the plurality of audio direction parameters occupy more than a hemisphere; 180 degrees of the circle when the spatial utilization defined by the elevation values and the azimuth values of the plurality of audio direction parameters occupy less than a hemisphere; 90 degrees of the circle when the spatial utilization defined by the elevation values and the azimuth values of the plurality of audio direction parameters occupy less than a quadrant of a sphere; and a defined number of degrees of the circle when the spatial utilization defined by the elevation values and the azimuth values of the plurality of audio direction parameters occupy less than a threshold range of angles of a sphere.

The number of positions around a circumference of the circle may be determined by a determined number of audio direction parameters.

The corresponding derived audio direction parameters may be arranged in a manner determined by a spatial utilization defined by the elevation values and the azimuth values of the plurality of audio direction parameters.

The means configured to quantize the difference between the audio direction parameter and a rotated derived audio direction parameter and the differential parameter value may be configured to determine a difference quantization resolution for each of the plurality of audio direction parameters based on a spatial extent of the audio direction parameters.

The means configured to determine whether, for a preceding frame, any of the plurality of audio direction parameters were differentially encoded may be configured to determine any of the plurality of audio direction parameters were differentially encoded for a determined number of contiguous preceding frames.

The means configured to generate, for any audio direction parameter which was not differentially encoded in the preceding frame, a differential parameter value may be configured to perform at least one of: generate an indicator based on a determination of a difference between the frame parameter elevation value and a preceding frame parameter elevation value is less than a determined elevation difference threshold and a difference between the frame parameter azimuth value and a preceding frame parameter azimuth value is less than a determined azimuth difference threshold; generate an indicator based on determining a difference between the frame parameter elevation value and a preceding frame parameter elevation value is less than a determined elevation difference threshold and a difference between the frame parameter elevation value and a preceding frame parameter elevation value is less than a determined elevation difference threshold; generate, for any audio direction parameter which was not differentially encoded in the considered preceding frame, a differential parameter value based on a difference between the frame parameter elevation value and a preceding frame parameter elevation value and a difference between the frame parameter azimuth value and a preceding frame parameter azimuth value, when a difference between the frame parameter azimuth value and a preceding frame parameter azimuth value is less than a determined azimuth difference threshold; and generate, for any audio direction parameter which was not differentially encoded in the considered preceding frame, a differential parameter value based on a difference between the frame parameter elevation value and a preceding frame parameter elevation value and a difference between the frame parameter azimuth value and a preceding frame parameter azimuth value, when a difference between the frame parameter elevation value and a preceding frame parameter elevation value is less than a determined elevation difference threshold.

The means configured to select for each of the plurality of audio direction parameters, either of the quantized difference or differential parameter value may be based on a determination of which requires a fewer number of bits to encode where there are both the quantized difference and the differential parameter value for the audio direction parameter and the quantized difference otherwise.

The means configured to rotate each derived audio direction parameter by the azimuth value of a first audio direction parameter of the plurality of audio direction parameters may be configured to: add the azimuth value of the first audio direction parameter to the azimuth value of each derived audio direction parameter, wherein the elevation value of each derived audio direction parameter is set to zero.

The means configured to quantize the difference between the audio direction parameter and a rotated derived audio direction parameter and the differential parameter value may be further configured to scalar quantize the azimuth value of the first audio direction parameter, and the means may be configured to index the positions of the audio direction parameters after the changing by assigning an index to a permutation of indices representing the order of the positions of the audio direction parameters.

The means configured to determine for each of the plurality audio direction parameters a difference between each audio direction parameter and their corresponding quantized rotated derived audio direction parameter may be further configured to: determine for each of the plurality of audio direction parameters a difference audio direction parameter based on at least: a difference between the first positioned audio direction parameter and the first positioned rotated derived audio direction parameter; and/or a difference between a further audio direction parameter and a rotated derived audio direction parameter, wherein the position of the further audio direction parameter is unchanged; and/or a difference between a yet further audio direction parameter and a rotated derived audio direction parameter wherein the position of the yet further audio direction parameter has been changed to the position of the rotated derived audio direction parameter.

The means configured to change the position of an audio direction parameter to a further position may apply to any audio direction parameter but the first positioned audio direction parameter.

The means configured to quantize the difference between the audio direction parameter and a rotated derived audio direction parameter and the differential parameter value may be configured to quantize the difference and the differential parameter value as a vector being indexed to a codebook comprising a plurality of indexed elevation values and indexed azimuth values.

The plurality of indexed elevation values and indexed azimuth values may be points on a grid arranged in a form of a sphere, wherein the spherical grid may be formed by covering the sphere with smaller spheres, wherein the smaller spheres define points of the spherical grid.

The means may furthermore be configured to: determine whether any of the plurality of encoded audio direction parameters are differentially encoded and furthermore the preceding frame encoded audio direction parameter is missing; and determine an estimate of the differentially encoded audio direction based on an extrapolation of at least two available preceding frames encoded audio direction parameters or based on the determined configuration of directional values, of which the configuration is rotated, and at least one directional difference value.

According to a fourth aspect is provided an apparatus for spatial audio signal decoding comprising means configured to: obtain, for a first frame, a plurality of encoded audio direction parameters and associated signalling; determine whether any of the plurality of encoded audio direction parameters are differentially encoded based on a preceding obtained frame encoded audio direction parameter; decode the determined differentially encoded audio direction parameters based on associated preceding obtained frame encoded audio direction parameters and decoded parameters; decode the remaining encoded audio direction parameters based on a determined configuration of directional values, of which the configuration is rotated, and at least one directional difference value modifies at least one element thereof; and reorder the differentially decoded and configuration decoded directional values based on the associated signalling.

The means configured to decode the remaining encoded audio direction parameters based on a determined configuration of directional values, of which the configuration is rotated, and at least one directional difference value modifies at least one element thereof may be configured to: determine a configuration of directional values based on an encoded space utilization parameter within the associated signalling; determine a rotation angle based on an encoded rotation parameter within the associated signalling; apply the rotation angle to the configuration of directional values to generate a rotated configuration of directional values, the rotated configuration of directional values comprising a first directional value and second and further directional values; determine one or more difference values based on encoded difference values and encoded spatial extent values; and apply the one or more difference values to respective second and further respective directional values to generate modified second and further directional values.

The means configured to determine a configuration of directional values based on an encoded space utilization parameter within the associated signalling may be configured to derive the azimuth value of each derived audio direction parameter corresponds with a position of a plurality of positions around the circumference of a circle.

The plurality of positions around the circumference of the circle may be evenly distributed along one of: 360 degrees of the circle when the spatial utilization defined by the elevation values and the azimuth values of the plurality of audio direction parameters occupy more than a hemisphere; 180 degrees of the circle when the spatial utilization defined by the elevation values and the azimuth values of the plurality of audio direction parameters occupy less than a hemisphere; 90 degrees of the circle when the spatial utilization defined by the elevation values and the azimuth values of the plurality of audio direction parameters occupy less than a quadrant of a sphere; and a defined number of degrees of the circle when the spatial utilization defined by the elevation values and the azimuth values of the plurality of audio direction parameters occupy less than a threshold range of angles of a sphere.

According to a fifth aspect there is provided an apparatus comprising at least one processor and at least one memory including a computer program code, the at least one memory and the computer program code configured to, with the at least one processor, cause the apparatus at least to: obtain, for a first frame, a plurality of audio direction parameters, wherein each parameter comprises an elevation value and an azimuth value and wherein each parameter has an ordered position; determine whether, for a preceding frame, any of the plurality of audio direction parameters was differentially encoded based on a difference between the preceding frame parameter elevation value and a further preceding frame parameter elevation value and the preceding frame parameter azimuth value and a further preceding frame parameter azimuth value; generate, for any audio direction parameter which was not differentially encoded in the considered preceding frame, a differential parameter value based on a difference between the frame parameter elevation value and a preceding frame parameter elevation value and a difference between the frame parameter azimuth value and a preceding frame parameter azimuth value; generate for each of the plurality of audio direction parameters a difference parameter value based on a difference between the audio direction parameter and a rotated derived audio direction parameter; quantize the difference between the audio direction parameter and a rotated derived audio direction parameter and the differential parameter value; and select for each of the plurality of audio direction parameters, either of the quantized difference or differential parameter value.

The apparatus caused to generate for each of the plurality of audio direction parameters a difference parameter value based on a difference between the audio direction parameter and a rotated derived audio direction parameter may be caused to: derive for each of the plurality of audio direction parameters a corresponding derived audio direction parameter comprising an elevation and an azimuth value; rotate each derived audio direction parameter by the azimuth value of an audio direction parameter in the first position of the plurality of audio direction parameters and quantize the rotation to determine for each a corresponding quantized rotated derived audio direction parameter; change the ordered position of an audio direction parameter to a further position coinciding with a position of a rotated derived audio direction parameter when the azimuth value of the audio direction parameter is closest to the azimuth value of the further rotated derived audio direction parameter compared to the azimuth values of other rotated derived audio direction parameters; and determine for each of the plurality audio direction parameters a difference between each audio direction parameter and their corresponding quantized rotated derived audio direction parameter.

The apparatus caused to derive for each of the plurality of audio direction parameters a corresponding derived audio direction parameter comprising an elevation and an azimuth value may be caused to derive the azimuth value of each derived audio direction parameter corresponds with a position of a plurality of positions around the circumference of a circle.

The plurality of positions around the circumference of the circle may be evenly distributed along one of: 360 degrees of the circle when the spatial utilization defined by the elevation values and the azimuth values of the plurality of audio direction parameters occupy more than a hemisphere; 180 degrees of the circle when the spatial utilization defined by the elevation values and the azimuth values of the plurality of audio direction parameters occupy less than a hemisphere; 90 degrees of the circle when the spatial utilization defined by the elevation values and the azimuth values of the plurality of audio direction parameters occupy less than a quadrant of a sphere; and a defined number of degrees of the circle when the spatial utilization defined by the elevation values and the azimuth values of the plurality of audio direction parameters occupy less than a threshold range of angles of a sphere.

The number of positions around a circumference of the circle may be determined by a determined number of audio direction parameters.

The corresponding derived audio direction parameters may be arranged in a manner determined by a spatial utilization defined by the elevation values and the azimuth values of the plurality of audio direction parameters.

The apparatus caused to quantize the difference between the audio direction parameter and a rotated derived audio direction parameter and the differential parameter value may be caused to determine a difference quantization resolution for each of the plurality of audio direction parameters based on a spatial extent of the audio direction parameters.

The apparatus caused to determine whether, for a preceding frame, any of the plurality of audio direction parameters were differentially encoded may be caused to determine any of the plurality of audio direction parameters were differentially encoded for a determined number of contiguous preceding frames.

The apparatus caused to generate, for any audio direction parameter which was not differentially encoded in the preceding frame, a differential parameter value may be caused to perform at least one of: generate an indicator based on a determination of a difference between the frame parameter elevation value and a preceding frame parameter elevation value is less than a determined elevation difference threshold and a difference between the frame parameter azimuth value and a preceding frame parameter azimuth value is less than a determined azimuth difference threshold generate an indicator based on determining a difference between the frame parameter elevation value and a preceding frame parameter elevation value is less than a determined elevation difference threshold and a difference between the frame parameter elevation value and a preceding frame parameter elevation value is less than a determined elevation difference threshold; generate, for any audio direction parameter which was not differentially encoded in the considered preceding frame, a differential parameter value based on a difference between the frame parameter elevation value and a preceding frame parameter elevation value and a difference between the frame parameter azimuth value and a preceding frame parameter azimuth value, when a difference between the frame parameter azimuth value and a preceding frame parameter azimuth value is less than a determined azimuth difference threshold; and generate, for any audio direction parameter which was not differentially encoded in the considered preceding frame, a differential parameter value based on a difference between the frame parameter elevation value and a preceding frame parameter elevation value and a difference between the frame parameter azimuth value and a preceding frame parameter azimuth value, when a difference between the frame parameter elevation value and a preceding frame parameter elevation value is less than a determined elevation difference threshold.

The apparatus caused to select for each of the plurality of audio direction parameters, either of the quantized difference or differential parameter value may be caused to select based on a determination of which requires a fewer number of bits to encode where there are both the quantized difference and the differential parameter value for the audio direction parameter and the quantized difference otherwise.

The apparatus caused to rotate each derived audio direction parameter by the azimuth value of a first audio direction parameter of the plurality of audio direction parameters may be caused to: add the azimuth value of the first audio direction parameter to the azimuth value of each derived audio direction parameter, wherein the elevation value of each derived audio direction parameter is set to zero.

The apparatus caused to quantize the difference between the audio direction parameter and a rotated derived audio direction parameter and the differential parameter value may be further configured to scalar quantize the azimuth value of the first audio direction parameter, and the means may be caused to index the positions of the audio direction parameters after the changing by assigning an index to a permutation of indices representing the order of the positions of the audio direction parameters.

The apparatus caused to determine for each of the plurality audio direction parameters a difference between each audio direction parameter and their corresponding quantized rotated derived audio direction parameter may be further caused to: determine for each of the plurality of audio direction parameters a difference audio direction parameter based on at least: a difference between the first positioned audio direction parameter and the first positioned rotated derived audio direction parameter; and/or a difference between a further audio direction parameter and a rotated derived audio direction parameter, wherein the position of the further audio direction parameter is unchanged; and/or a difference between a yet further audio direction parameter and a rotated derived audio direction parameter wherein the position of the yet further audio direction parameter has been changed to the position of the rotated derived audio direction parameter.

The apparatus caused to change the position of an audio direction parameter to a further position may be caused to change the position of any audio direction parameter but the first positioned audio direction parameter.

The apparatus caused to quantize the difference between the audio direction parameter and a rotated derived audio direction parameter and the differential parameter value may be caused to quantize the difference and the differential parameter value as a vector being indexed to a codebook comprising a plurality of indexed elevation values and indexed azimuth values.

The plurality of indexed elevation values and indexed azimuth values may be points on a grid arranged in a form of a sphere, wherein the spherical grid may be formed by covering the sphere with smaller spheres, wherein the smaller spheres define points of the spherical grid.

The apparatus may furthermore be caused to: determine whether any of the plurality of encoded audio direction parameters are differentially encoded and furthermore the preceding frame encoded audio direction parameter is missing; and determine an estimate of the differentially encoded audio direction based on an extrapolation of at least two available preceding frames encoded audio direction parameters or based on the determined configuration of directional values, of which the configuration is rotated, and at least one directional difference value.

According to a sixth aspect there is provided an apparatus comprising at least one processor and at least one memory including a computer program code, the at least one memory and the computer program code configured to, with the at least one processor, cause the apparatus at least to: obtain, for a first frame, a plurality of encoded audio direction parameters and associated signalling; determine whether any of the plurality of encoded audio direction parameters are differentially encoded based on a preceding obtained frame encoded audio direction parameter; decode the determined differentially encoded audio direction parameters based on associated preceding obtained frame encoded audio direction parameters and decoded parameters; decode the remaining encoded audio direction parameters based on a determined configuration of directional values, of which the configuration is rotated, and at least one directional difference value modifies at least one element thereof; and reorder the differentially decoded and configuration decoded directional values based on the associated signalling.

The apparatus caused to decode the remaining encoded audio direction parameters based on a determined configuration of directional values, of which the configuration is rotated, and at least one directional difference value modifies at least one element thereof may be caused to: determine a configuration of directional values based on an encoded space utilization parameter within the associated signalling; determine a rotation angle based on an encoded rotation parameter within the associated signalling; apply the rotation angle to the configuration of directional values to generate a rotated configuration of directional values, the rotated configuration of directional values comprising a first directional value and second and further directional values; determine one or more difference values based on encoded difference values and encoded spatial extent values; and apply the one or more difference values to respective second and further respective directional values to generate modified second and further directional values.

The apparatus caused to determine a configuration of directional values based on an encoded space utilization parameter within the associated signalling may be caused to derive the azimuth value of each derived audio direction parameter corresponds with a position of a plurality of positions around the circumference of a circle.

The plurality of positions around the circumference of the circle may be evenly distributed along one of: 360 degrees of the circle when the spatial utilization defined by the elevation values and the azimuth values of the plurality of audio direction parameters occupy more than a hemisphere; 180 degrees of the circle when the spatial utilization defined by the elevation values and the azimuth values of the plurality of audio direction parameters occupy less than a hemisphere; 90 degrees of the circle when the spatial utilization defined by the elevation values and the azimuth values of the plurality of audio direction parameters occupy less than a quadrant of a sphere; and a defined number of degrees of the circle when the spatial utilization defined by the elevation values and the azimuth values of the plurality of audio direction parameters occupy less than a threshold range of angles of a sphere.

According to a seventh aspect there is provided an apparatus comprising: obtaining circuitry configured to obtain, for a first frame, a plurality of audio direction parameters, wherein each parameter comprises an elevation value and an azimuth value and wherein each parameter has an ordered position; determining circuitry configured to determine whether, for a preceding frame, any of the plurality of audio direction parameters was differentially encoded based on a difference between the preceding frame parameter elevation value and a further preceding frame parameter elevation value and the preceding frame parameter azimuth value and a further preceding frame parameter azimuth value; generating circuitry configured to generate, for any audio direction parameter which was not differentially encoded in the considered preceding frame, a differential parameter value based on a difference between the frame parameter elevation value and a preceding frame parameter elevation value and a difference between the frame parameter azimuth value and a preceding frame parameter azimuth value; generating circuitry configured to generate for each of the plurality of audio direction parameters a difference parameter value based on a difference between the audio direction parameter and a rotated derived audio direction parameter; quantizing circuitry configured to quantize the difference between the audio direction parameter and a rotated derived audio direction parameter and the differential parameter value; and selecting circuitry configured to select for each of the plurality of audio direction parameters, either of the quantized difference or differential parameter value.

According to an eighth aspect there is provided an apparatus comprising: obtaining circuitry configured to obtain, for a first frame, a plurality of encoded audio direction parameters and associated signalling; determining circuitry configured to determine whether any of the plurality of encoded audio direction parameters are differentially encoded based on a preceding obtained frame encoded audio direction parameter; decoding circuitry configured to decode the determined differentially encoded audio direction parameters based on associated preceding obtained frame encoded audio direction parameters and decoded parameters; decoding circuitry configured to decode the remaining encoded audio direction parameters based on a determined configuration of directional values, of which the configuration is rotated, and at least one directional difference value modifies at least one element thereof; and reordering circuitry configured to reorder the differentially decoded and configuration decoded directional values based on the associated signalling According to a ninth aspect there is provided a computer program comprising instructions [or a computer readable medium comprising program instructions] for causing an apparatus to perform at least the following: obtaining, for a first frame, a plurality of audio direction parameters, wherein each parameter comprises an elevation value and an azimuth value and wherein each parameter has an ordered position; determining whether, for a preceding frame, any of the plurality of audio direction parameters was differentially encoded based on a difference between the preceding frame parameter elevation value and a further preceding frame parameter elevation value and the preceding frame parameter azimuth value and a further preceding frame parameter azimuth value; generating, for any audio direction parameter which was not differentially encoded in the considered preceding frame, a differential parameter value based on a difference between the frame parameter elevation value and a preceding frame parameter elevation value and a difference between the frame parameter azimuth value and a preceding frame parameter azimuth value; generating for each of the plurality of audio direction parameters a difference parameter value based on a difference between the audio direction parameter and a rotated derived audio direction parameter; quantizing the difference between the audio direction parameter and a rotated derived audio direction parameter and the differential parameter value; and selecting for each of the plurality of audio direction parameters, either of the quantized difference or differential parameter value.

According to a tenth aspect there is provided a computer program comprising instructions [or a computer readable medium comprising program instructions] for causing an apparatus to perform at least the following: obtaining, for a first frame, a plurality of encoded audio direction parameters and associated signalling; determining whether any of the plurality of encoded audio direction parameters are differentially encoded based on a preceding obtained frame encoded audio direction parameter; decoding the determined differentially encoded audio direction parameters based on associated preceding obtained frame encoded audio direction parameters and decoded indicators; decoding the remaining encoded audio direction parameters based on a determined configuration of directional values, of which the configuration is rotated, and at least one directional difference value modifies at least one element thereof; and reordering the differentially decoded and configuration decoded directional values based on the associated signalling.

According to an eleventh aspect there is provided a non-transitory computer readable medium comprising program instructions for causing an apparatus to perform at least the following: obtaining, for a first frame, a plurality of audio direction parameters, wherein each parameter comprises an elevation value and an azimuth value and wherein each parameter has an ordered position; determining whether, for a preceding frame, any of the plurality of audio direction parameters was differentially encoded based on a difference between the preceding frame parameter elevation value and a further preceding frame parameter elevation value and the preceding frame parameter azimuth value and a further preceding frame parameter azimuth value; generating, for any audio direction parameter which was not differentially encoded in the considered preceding frame, a differential parameter value based on a difference between the frame parameter elevation value and a preceding frame parameter elevation value and a difference between the frame parameter azimuth value and a preceding frame parameter azimuth value; generating for each of the plurality of audio direction parameters a difference parameter value based on a difference between the audio direction parameter and a rotated derived audio direction parameter; quantizing the difference between the audio direction parameter and a rotated derived audio direction parameter and the differential parameter value; and selecting for each of the plurality of audio direction parameters, either of the quantized difference or differential parameter value.

According to a twelfth aspect there is provided a non-transitory computer readable medium comprising program instructions for causing an apparatus to perform at least the following: obtaining, for a first frame, a plurality of encoded audio direction parameters and associated signalling; determining whether any of the plurality of encoded audio direction parameters are differentially encoded based on a preceding obtained frame encoded audio direction parameter; decoding the determined differentially encoded audio direction parameters based on associated preceding obtained frame encoded audio direction parameters and decoded indicators; decoding the remaining encoded audio direction parameters based on a determined configuration of directional values, of which the configuration is rotated, and at least one directional difference value modifies at least one element thereof; and reordering the differentially decoded and configuration decoded directional values based on the associated signalling.

According to a thirteenth aspect there is provided an apparatus comprising: means for obtaining, for a first frame, a plurality of audio direction parameters, wherein each parameter comprises an elevation value and an azimuth value and wherein each parameter has an ordered position; means for determining whether, for a preceding frame, any of the plurality of audio direction parameters was differentially encoded based on a difference between the preceding frame parameter elevation value and a further preceding frame parameter elevation value and the preceding frame parameter azimuth value and a further preceding frame parameter azimuth value; means for generating, for any audio direction parameter which was not differentially encoded in the considered preceding frame, a differential parameter value based on a difference between the frame parameter elevation value and a preceding frame parameter elevation value and a difference between the frame parameter azimuth value and a preceding frame parameter azimuth value; means for generating for each of the plurality of audio direction parameters a difference parameter value based on a difference between the audio direction parameter and a rotated derived audio direction parameter; means for quantizing the difference between the audio direction parameter and a rotated derived audio direction parameter and the differential parameter value; and means for selecting for each of the plurality of audio direction parameters, either of the quantized difference or differential parameter value.

According to a fourteenth aspect there is provided an apparatus comprising: means for obtaining, for a first frame, a plurality of encoded audio direction parameters and associated signalling; means for determining whether any of the plurality of encoded audio direction parameters are differentially encoded based on a preceding obtained frame encoded audio direction parameter; means for decoding the determined differentially encoded audio direction parameters based on associated preceding obtained frame encoded audio direction parameters and decoded indicators; means for decoding the remaining encoded audio direction parameters based on a determined configuration of directional values, of which the configuration is rotated, and at least one directional difference value modifies at least one element thereof; and means for reordering the differentially decoded and configuration decoded directional values based on the associated signalling.

According to a fifteenth aspect there is provided a computer readable medium comprising program instructions for causing an apparatus to perform at least the following: obtaining, for a first frame, a plurality of audio direction parameters, wherein each parameter comprises an elevation value and an azimuth value and wherein each parameter has an ordered position; determining whether, for a preceding frame, any of the plurality of audio direction parameters was differentially encoded based on a difference between the preceding frame parameter elevation value and a further preceding frame parameter elevation value and the preceding frame parameter azimuth value and a further preceding frame parameter azimuth value; generating, for any audio direction parameter which was not differentially encoded in the considered preceding frame, a differential parameter value based on a difference between the frame parameter elevation value and a preceding frame parameter elevation value and a difference between the frame parameter azimuth value and a preceding frame parameter azimuth value; generating for each of the plurality of audio direction parameters a difference parameter value based on a difference between the audio direction parameter and a rotated derived audio direction parameter; quantizing the difference between the audio direction parameter and a rotated derived audio direction parameter and the differential parameter value; and selecting for each of the plurality of audio direction parameters, either of the quantized difference or differential parameter value.

According to a sixteenth aspect there is provided a computer readable medium comprising program instructions for causing an apparatus to perform at least the following: obtaining, for a first frame, a plurality of encoded audio direction parameters and associated signalling; determining whether any of the plurality of encoded audio direction parameters are differentially encoded based on a preceding obtained frame encoded audio direction parameter; decoding the determined differentially encoded audio direction parameters based on associated preceding obtained frame encoded audio direction parameters and decoded indicators; decoding the remaining encoded audio direction parameters based on a determined configuration of directional values, of which the configuration is rotated, and at least one directional difference value modifies at least one element thereof; and reordering the differentially decoded and configuration decoded directional values based on the associated signalling. A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
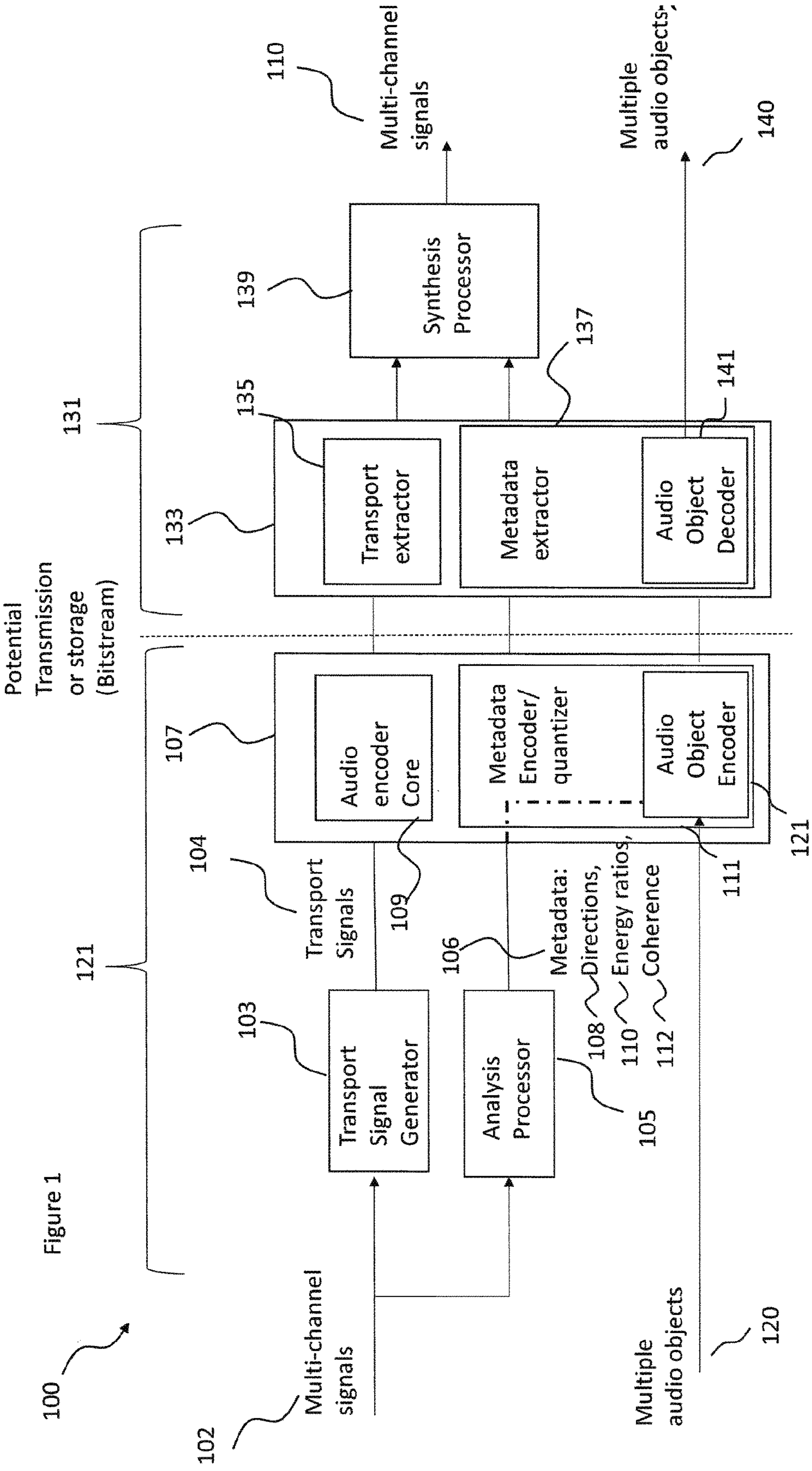
FIG. 1 shows schematically a system of apparatus suitable for implementing some embodiments.

The following describes in further detail suitable apparatus and possible mechanisms for the provision of effective spatial analysis derived metadata parameters for multi-channel input format audio signals and input audio objects. In the following discussions multi-channel system is discussed with respect to a multi-channel microphone implementation. However as discussed above the input format may be any suitable input format, such as multi-channel loudspeaker, ambisonic (FOA/HOA) etc. It is understood that in some embodiments the channel location is based on a location of the microphone or is a virtual location or direction.

Furthermore the output of the example system is a multi-channel loudspeaker arrangement. However it is understood that the output may be rendered to the user via means other than loudspeakers. Furthermore, the multi-channel loudspeaker signals may be generalised to be two or more playback audio signals.

As discussed previously spatial metadata parameters such as direction and direct-to-total energy ratio (or diffuseness-ratio, absolute energies, or any suitable expression indicating the directionality/non-directionality of the sound at the given time-frequency interval) parameters in frequency bands are particularly suitable for expressing the perceptual properties of natural sound fields. Synthetic sound scenes such as 5.1 loudspeaker mixes commonly utilize audio effects and amplitude panning methods that provide spatial sound that differs from sounds occurring in natural sound fields. In particular, a 5.1 or 7.1 mix may be configured such that it contains coherent sounds played back from multiple directions. For example, it is common that some sounds of a 5.1 mix perceived directly at the front are not produced by a centre (channel) loudspeaker, but for example coherently from left and right front (channels) loudspeakers, and potentially also from the centre (channel) loudspeaker. The spatial metadata parameters such as direction(s) and energy ratio(s) do not express such spatially coherent features accurately. As such other metadata parameters such as coherence parameters may be determined from analysis of the audio signals to express the audio signal relationships between the channels.

In addition to multi-channel input format audio signals an encoding system may also be required to encode audio objects representing various sound sources within a physical space. Each audio object can be accompanied, whether it is in the form of metadata or some other mechanism, by directional data in the form of azimuth and elevation values which indicate the position of an audio object within a physical space.

As expressed above an example of the incorporation of direction information for audio objects as metadata is to use determined azimuth and elevation values. However conventional uniform azimuth and elevation sampling produces a non-uniform direction distribution.

The concept as discussed in further detail in the embodiments as discussed herein other components of the object metadata, such as gain and spatial extent are used to determine the quantization resolution of the directional information for each object. In addition in some embodiments in order to ensure that there are no jumps in the object position the quantization is implemented such that the time evolution of the quantized angle value follows the time evolution of the non-quantized angle values.

The proposed directional index for audio objects may then be used alongside a downmix signal ('channels'), to define a parametric immersive format that can be utilized, e.g., for the Immersive Voice and Audio Service (IVAS) codec.

In the following the decoding of such indexed direction parameters to produce quantised directional parameters which can be used in synthesis of spatial audio based on audio object sound-field related parameterization is also discussed.

With respect to FIG. 1 an example apparatus and system for implementing embodiments of the application are shown. The system 100 is shown with an 'analysis' part 121 and a 'synthesis' part 131. The 'analysis' part 121 is the part from receiving the multi-channel loudspeaker signals up to an encoding of the metadata and downmix signal and the 'synthesis' part 131 is the part from a decoding of the encoded metadata and downmix signal to the presentation of the re-generated signal (for example in multi-channel loudspeaker form).

The input to the system 100 and the 'analysis' part 121 is the multi-channel signals 102. In the following examples a microphone channel signal input is described, however any suitable input (or synthetic multi-channel) format may be implemented in other embodiments.

The multi-channel signals are passed to a downmixer 103 and to an analysis processor 105.

In some embodiments the downmixer 103 is configured to receive the multi-channel signals and downmix the signals to a determined number of channels and output the downmix signals 104. For example the downmixer 103 may be configured to generate a 2 audio channel downmix of the multi-channel signals. The determined number of channels may be any suitable number of channels. In some embodiments the downmixer 103 is optional and the multi-channel signals are passed unprocessed to an encoder 107 in the same manner as the downmix signal are in this example.

In some embodiments the analysis processor 105 is also configured to receive the multi-channel signals and analyse the signals to produce metadata 106 associated with the multi-channel signals and thus associated with the downmix signals 104. The analysis processor 105 may be configured to generate the metadata which may comprise, for each time-frequency analysis interval, a direction parameter 108, an energy ratio parameter 110, a coherence parameter 112, and a diffuseness parameter 114. The direction, energy ratio and diffuseness parameters may in some embodiments be considered to be spatial audio parameters. In other words the spatial audio parameters comprise parameters which aim to characterize the sound-field created by the multi-channel signals (or two or more playback audio signals in general). The coherence parameters may be considered to be signal relationship audio parameters which aim to characterize the relationship between the multi-channel signals.

In some embodiments the parameters generated may differ from frequency band to frequency band. Thus for example in band X all of the parameters are generated and transmitted, whereas in band Y only one of the parameters is generated and transmitted, and furthermore in band Z no parameters are generated or transmitted. A practical example of this may be that for some frequency bands such as the highest band some of the parameters are not required for perceptual reasons. The downmix signals 104 and the metadata 106 may be passed to an encoder 107.

The encoder 107 may comprise an IVAS stereo core 109 which is configured to receive the downmix (or otherwise) signals 104 and generate a suitable encoding of these audio signals. The encoder 107 can in some embodiments be a computer (running suitable software stored on memory and on at least one processor), or alternatively a specific device utilizing, for example, FPGAs or ASICs. The encoding may be implemented using any suitable scheme. The encoder 107 may furthermore comprise a metadata encoder or quantizer 109 which is configured to receive the metadata and output an encoded or compressed form of the information. Additionally, there may also be an audio object encoder 121 within the encoder 107 which in embodiments may be arranged to encode data (or metadata) associated with the multiple audio objects along the input 120. The data associated with the multiple audio objects may comprise at least in part directional data.

In some embodiments the encoder 107 may further interleave, multiplex to a single data stream or embed the metadata within encoded downmix signals before transmission or storage shown in FIG. 1 by the dashed line. The multiplexing may be implemented using any suitable scheme.

In the decoder side, the received or retrieved data (stream) may be received by a decoder/demultiplexer 133. The decoder/demultiplexer 133 may demultiplex the encoded streams and pass the audio encoded stream to a downmix extractor 135 which is configured to decode the audio signals to obtain the downmix signals. Similarly, the decoder/demultiplexer 133 may comprise a metadata extractor 137 which is configured to receive the encoded metadata and generate metadata.

Additionally, the decoder/demultiplexer 133 may also comprise an audio object decoder 141 which can be configured to receive encoded data associated with multiple audio objects and accordingly decode such data to produce the corresponding decoded data 140. The decoder/demultiplexer 133 can in some embodiments be a computer (running suitable software stored on memory and on at least one processor), or alternatively a specific device utilizing, for example, FPGAs or ASICs.

The decoded metadata and downmix audio signals may be passed to a synthesis processor 139.

The system 100 'synthesis' part 131 further shows a synthesis processor 139 configured to receive the downmix and the metadata and re-creates in any suitable format a synthesized spatial audio in the form of multi-channel signals 110 (these may be multichannel loudspeaker format or in some embodiments any suitable output format such as binaural or Ambisonics signals, depending on the use case) based on the downmix signals and the metadata.

In some embodiments there may be an additional input 120 which may specifically comprise directional data associated with multiple audio objects. One particular example of such a use case is a teleconference scenario where participants are positioned around a table. Each audio object may represent audio data associated with each participant. In particular the audio object may have positional data associated with each participant. The data associated with the audio objects is depicted in FIG. 1 as being passed to the audio object encoder 121. In the following examples the encoding of the audio object metadata is based on the additional input 120 audio object information only. It may be possible in some embodiments to also obtain (as shown by the dashed line) audio object metadata determined by the analysis processor 105 according to any suitable analysis method. However the obtaining of this audio object metadata and the use thereof is not herein described in detail.

The system 100 can thus in some embodiments be configured to accept multiple audio objects with associated metadata such as direction (or position), spatial extent, gain, energy/power values, energy ratios, coherence etc along the input 120 or from the analysis processor 105. The audio objects with the associated directional data may be passed to a metadata encoder/quantizer 111 and in some embodiments a specific audio object encoder 121 for encoding and quantizing the metadata.

To that extent the directional data associated with each audio object can be expressed in terms of azimuth $\varphi$ and elevation $\theta$, where the azimuth value and elevation value of each audio object indicates the position of the object in space at any point in time. The azimuth and elevation values can be updated on a time frame by time frame basis which does not necessarily have to coincide with the time frame resolution of the directional metadata parameters associated with the multi-channel audio signals.

In general, the directional information for N active input audio objects to the audio object encoder 121 may be expressed in the form of $P_q=(\theta_q, \phi_q)$, q=0: N−1, where $P_q$ is the directional information of an audio object with index q having a two dimensional vector comprising elevation $\theta$ value and the azimuth $\varphi$ value.

The concept as discussed in further detail hereafter relates specifically to the encoding of the directional information of objects. The directional information part of the metadata consists of azimuth and elevation. Additional or associated information such as object distance, gain, spatial extent can be also encoded. The directional information may be expressed as the angles for each audio object that should be transmitted at each frame. In some use cases, such as teleconferences, the object positions may be constant or have small variations making the inter-frame differential encoding very efficient from the point of view of bitrate. The concept furthermore attempts to overcome the sensitivity of differential encoding to frame erasure errors.

In some embodiments encoding of audio object directions can be implemented by the use of differential encoding with a prediction streak limiter and audio object vector based difference encoding. Thus in some embodiments there may be employed a joint encoding of the directional information for each object by calculating the angle differences with respect to a rotated first stage super-codevector of predetermined positions in space (where additionally in some embodiments the codevector is based on the space utilization of all the audio objects and furthermore the angle differences encoded using a quantization resolution dependent on the spatial extent of the object.

In some embodiments differential encoding is used for a subset of objects which may change from frame to frame. The number of objects for which differential encoding is used may furthermore depend on the overall codec bitrate available.

Figure 2A:
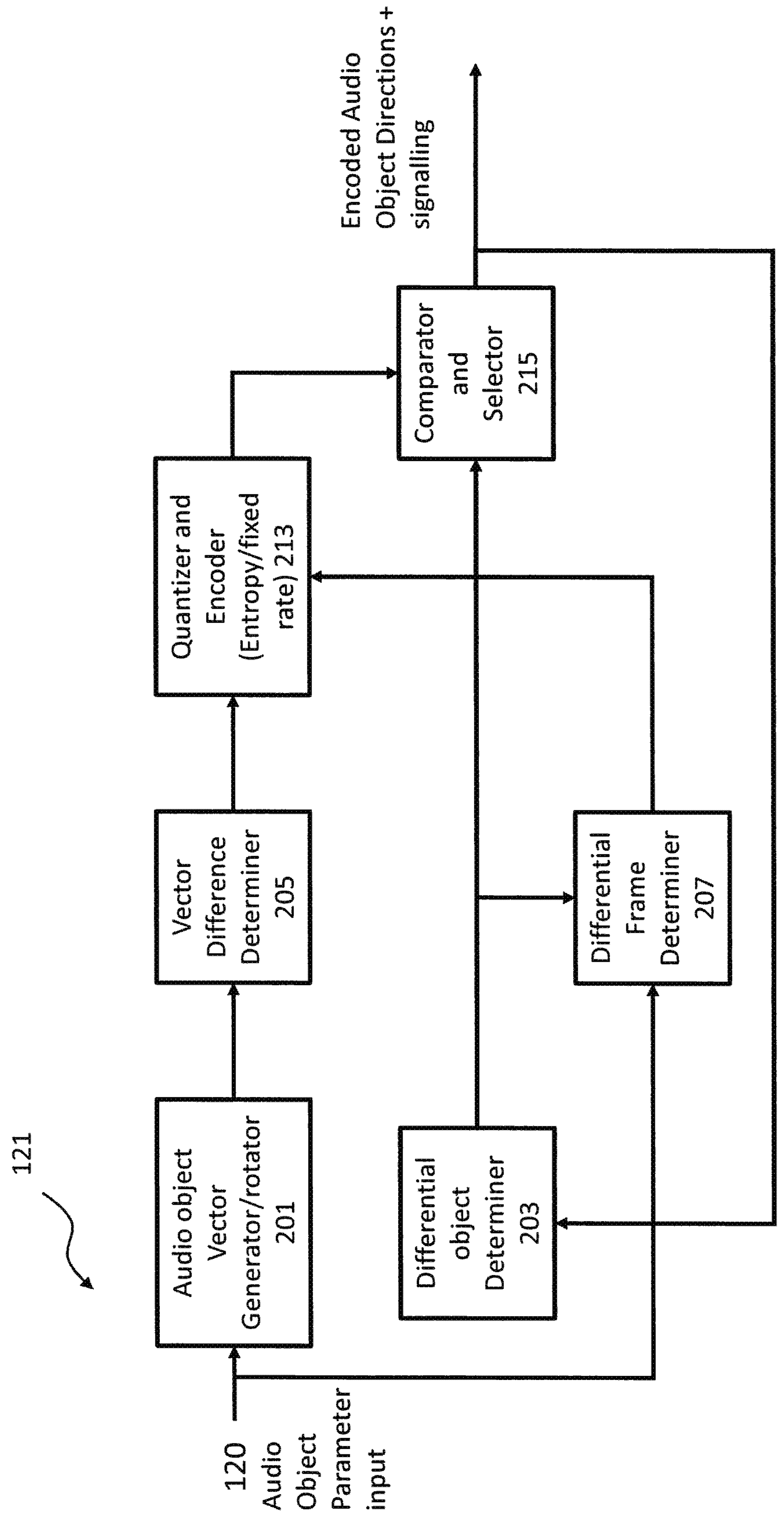
FIGS. 2*a* and 2*b* show schematically the audio object encoder as shown in FIG. 1 according to some embodiments.

In this regard FIG. 2*a* depicts some of the functionality of the audio object encoder 121 in more detail.

In some embodiments the audio object encoder 121 comprises an audio object vector generator/rotator 201. The audio object vector generator/rotator 201 is configured to receive the audio object parameters, for example the directions in azimuth and elevation, the spatial extent, object distance, gain etc and from this be configured to generate a generic or template audio object vector (in other words a vector approximating the directions of all of the audio objects). Additionally this vector may then be rotated such that at least one of the elements of the vector is aligned with the direction of one of the audio objects (typically the first audio object). In some embodiments this rotation angle is encoded and becomes part of the information associated with the encoded directions which will be stored/transmitted. In some embodiments the audio objects are re-indexed such that the difference between one of the audio objects and one of the elements of the rotated template audio object vector is minimised. The permutation of the re-indexing can then be encoded and also becomes part of the information associated with the encoded directions. The rotated template audio object vector and re-indexed directions can then be passed to a difference determiner/quantizer 205.

In some embodiments the audio object encoder 121 comprises a vector difference determiner 205. The vector difference determiner 205 is configured to determine the difference between a re-indexed audio object direction and the associated quantized rotated template audio object vector and pass this to a quantizer and encoder 213.

In some embodiments the audio object encoder 121 comprises a differential object determiner 203. The differential object determiner 203 is configured to determine for a frame j which of the N audio objects were not encoded in frame j−1 using a differential encoding (in other words which of the audio objects in frame j−1 were encoded using information from frame j−2). In this example the frame limiter is set at one but in some embodiments the prediction streak limit is any suitable number.

This information can then be passed to the difference determiner/quantizer 205 and also to the differential frame determiner 207.

In some embodiments the audio object encoder 121 comprises a differential frame determiner 207 configured to receive the audio object directions for this frame j and the previous frame j−1 and determine the difference frame to frame. The differential determination of the directional information is implemented in the angle domain, not for the angle differences. In other words, the determined difference is between the elevation at frame j and the elevation at frame j−1 and between the azimuth at frame j and the azimuth at frame j−1. These can then be passed to the quantizer and encoder 213.

In some embodiments the audio object encoder 121 comprises a quantizer and encoder 213. In some embodiments with respect to the received differential frame determiner 207 outputs where the value is a null value difference for both azimuth and elevation, then the quantizer and encoder 213 is configured to separately signal this with one bit (or any suitable indication). In other words, if both angle differences in time are zero, one bit is sent to signal this. If the inter-frame difference is not zero, one bit is used for signaling and the difference is quantized using a spherical grid or other suitable difference grid.

In some embodiments the quantizer and encoder 213 is configured to determine or calculate the number of bits for the differential encoding based on using a suitable entropy encoding scheme (for example by using the mean removed Golomb Rice coding over all objects which includes the one(s) using the differential encoding method and the ones without).

The quantizer and encoder 213 can also quantize and encode the differences between the re-indexed audio object direction and the associated rotated template audio object vector.

These differences can then be passed to a comparator and selector 215.

In some embodiments the audio object encoder 121 comprises a comparator and selector 215. The comparator and selector 215 can be configured to receive the encoded values based on the encoded vector differences and the encoded differential frames and compare these to determine whether the differential encoding (DE) gives a lower number of bits than the bits allocated to the encoding of differences between the between a re-indexed audio object direction and the associated rotated template audio object vector. Where the differential encoding using fewer bits then the comparator and selector can be configured to use differential encoding and further use a bit or other indicator to signal this.

Furthermore the comparator and selector 215 can be configured to store this decision that for frame j the object i has used DE (for example by the feedback to the differential object determiner 203). Elsewise in some embodiments the encoded version of the quantized (scalar or spherical grid quantized) differences between the between a re-indexed audio object direction and the associated rotated template audio object vector is output. Then this decision is indicated (for example using a bit).

Figure 6A:
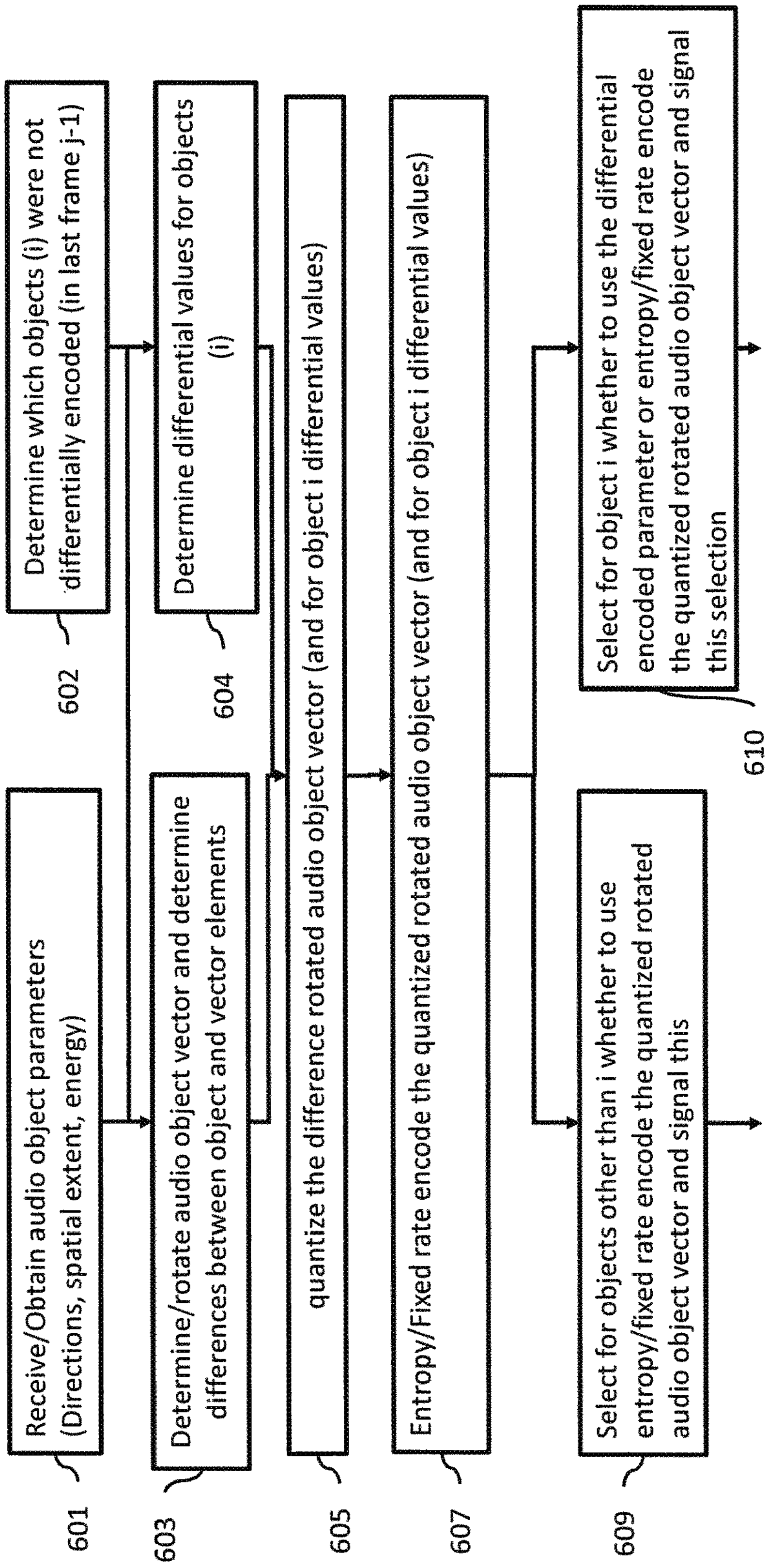
FIGS. 6*a*, 6*b*, and 6*c* show flow diagrams of the operation of the audio object encoder as shown in FIGS. 2*a* and 2*b* according to some embodiments.
Figure 6B:
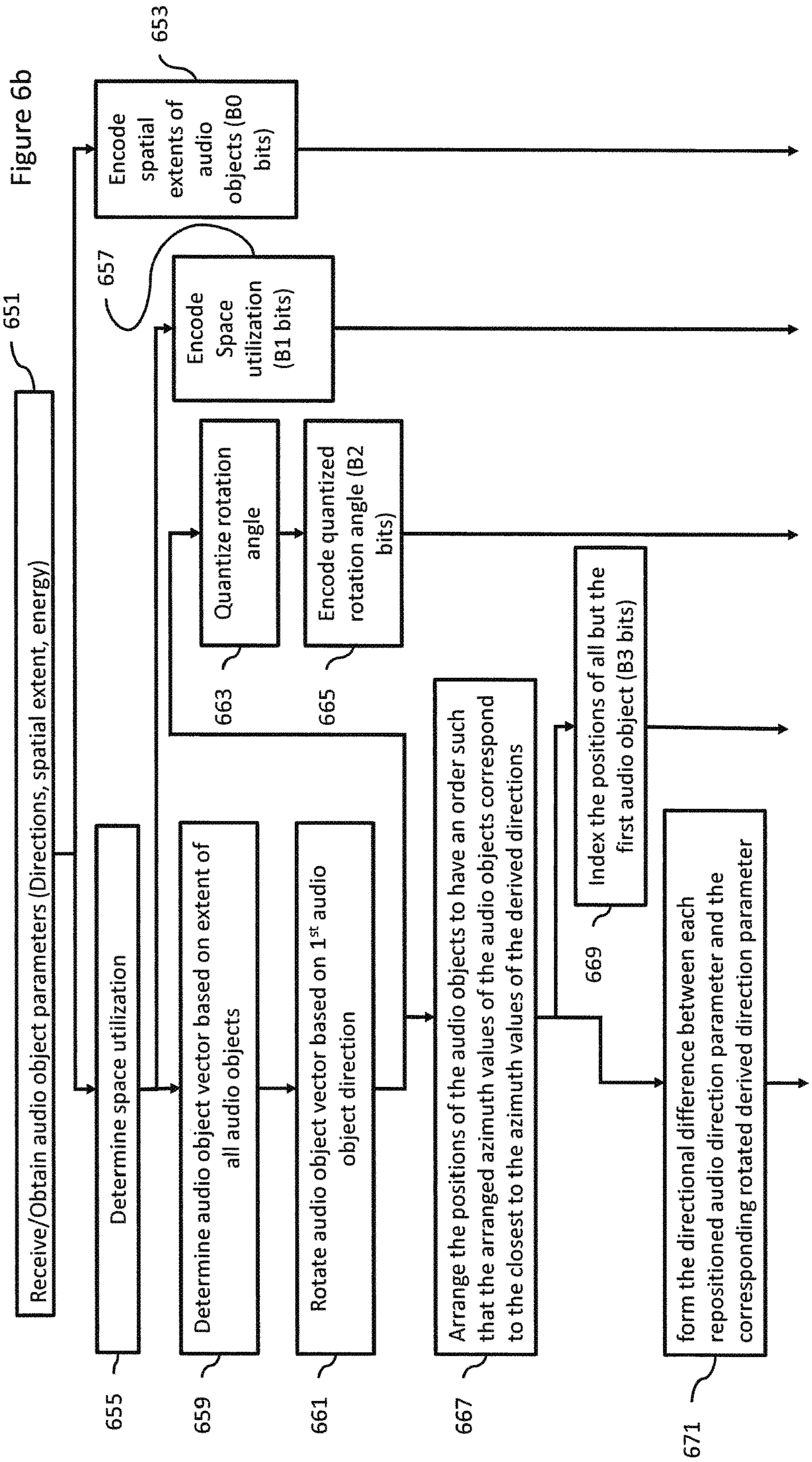

With respect to FIG. 6*a* is shown an example flow diagram showing the operations of the audio object encoder 121 as shown in FIG. 2*a*.

The first operation is one of receiving/obtaining audio object parameters as shown in FIG. 6*a* by step 601.

Which objects (i) were not differentially encoded in the previous frame (j-1) is then determined as shown in FIG. 6*a* by step 602.

Then the audio object vector is determined, rotated and the differences between the re-indexed audio object directions and the associated rotated template audio object vector elements determined as shown in FIG. 6*a* by step 603.

Also differential values for the identified objects i are determined (direction differences based on this frame and the previous frame) as shown in FIG. 6*a* by step 604.

The differences (both between the re-indexed audio object directions and the associated rotated template audio object vector elements) and the frame differential values are quantized as shown in FIG. 6*a* by step 605.

The quantized values can then be encoded (using entropy/fixed rate encoding) as shown in FIG. 6*a* by step 607.

For objects other than i, then the method is configured to select whether to use entropy or fixed rate encoding for the quantized rotated audio object vector and signal this as shown in FIG. 6*a* by step 609.

For objects i, then the method is configured to select whether to use the differential encoded parameter or the entropy or fixed rate encoding for the quantized rotated audio object vector and signal this as shown in FIG. 6*a* by step 610.

Figure 2B:
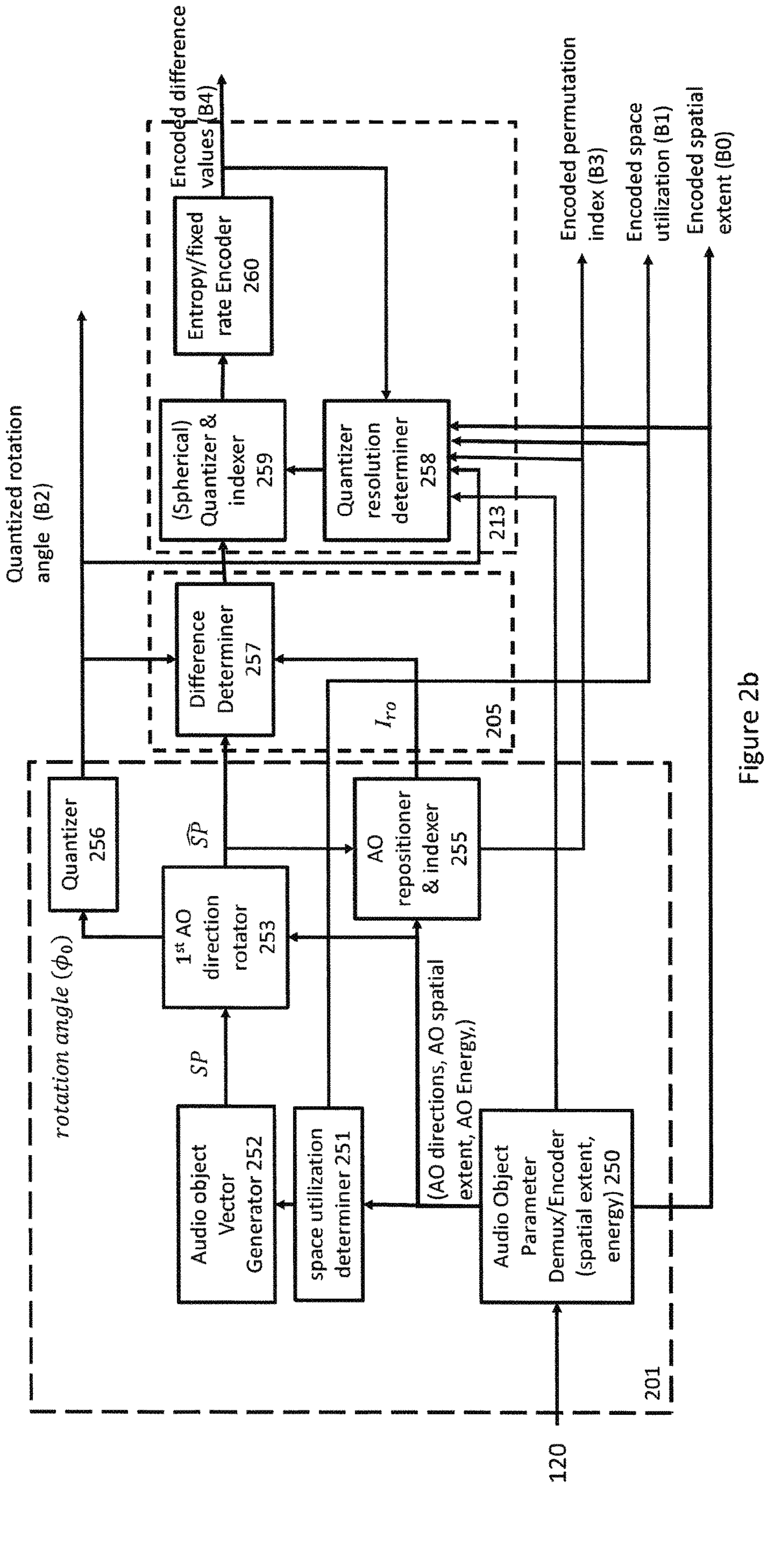

With respect to FIG. 2*b* is shown an example of the audio object vector generator/rotator 201, vector difference determiner 205 and quantizer and encoder (entropy/fixed rate) 213.

The audio object vector generator/rotator 201 can comprise in some embodiments an audio object parameter demultiplexer (Demux)/encoder 250. The audio object parameter demultiplexer (Demux)/encoder 250 can be configured to receive the audio object parameter input 120 and determine or obtain or demultimplex parameters associated with the audio objects from the input. For example as shown in FIG. 2*b* is shown the audio object parameter demultiplexer (Demux)/encoder 250 generating or obtaining otherwise the directions associated with each audio object, a spatial extent associated with each audio object and the energy associated with each audio object. In some embodiments the spatial extent of each audio object is encoded using B0 bits.

The audio object vector generator/rotator 201 can comprise a space utilization determiner 251. The space utilization determiner 251 can be configured to receive all of the directions of all of the audio objects and determine the range of the azimuth and elevation which contain all of the audio objects. The utilization of the space based on the audio objects can be within a hemisphere (and identify which hemisphere or the centre or mean of the hemisphere), whether all of the audio objects are within a quadrant of the sphere (and identify which quadrant or the centre or mean of the quadrant) or identify whether the range is more than (or less than) a defined range threshold). In some embodiments the results of this determination can be encoded (for example using 1 bit to identify which hemisphere, 2 bits to identify which quadrant etc). Thus in some embodiments this information can be encoded using B1 bits. The identified space utilization may furthermore be passed to the audio object vector generator 202.

The audio object vector generator/rotator 201 can comprise an audio object vector generator 252. The audio object vector generator 252 is arranged to derive a suitable initial "template" direction for each audio object. The initial "template" direction for each object (which may be in a vector format) can in some embodiments be generated based on the identified space utilization. For example, in some embodiments, the audio object vector generator 252 is configured to generate a vector having N derived directions corresponding to the N audio objects. Where the space utilization of all of the objects is over the complete sphere (in other words not determined to be within a hemisphere, quadrant or other determined range) then the initial "template" directions may be distributed around the circumference of a circle. In particular embodiments the derived directions can be considered from the viewpoint of the audio objects directions being evenly distributed as N equidistant points around a unit circle.

In some embodiments the N derived directions are disclosed as being formed into a vector structure (termed a vector, SP) with each element corresponding to the derived direction for one of the N audio objects. However, it is to be understood that the vector structure is not a necessary requirement, and that the following disclosure can be equally applied by considering the audio objects as a collection of indexed audio objects which do not have to be necessarily structured in the form of vectors.

The audio object vector generator 252 can thus be configured to derive a "template" derived vector SP having N two dimensional elements, whereby each element represents the azimuth and elevation associated with an audio object. The vector SP (for the whole sphere space utilization determination) may then be initialised by setting the azimuth and elevation value of each element such that the N audio objects are evenly distributed around a unit circle. This can be realised by initializing each audio object direction element within the vector to have an elevation value of zero and an azimuth value of $$q \cdot \frac{360}{N}$$

where q is the index of the associated audio object. Therefore, the vector SP can be written for the N audio objects as:

$$SP = \left(0, 0; 0, \frac{360}{N}; 0, 2 \cdot \frac{360}{N}; \ \ldots \ ; 0, (N-1) \cdot \frac{360}{N}\right)$$

In other words, the SP vector can be initialised so that the directional information of each audio object is presumed to be distributed evenly along a unit circle starting at an azimuth value of 0°.

In some embodiments where the space utilization is determined to be within a hemisphere then the audio object vector generator 252 can be configured to derive a "template" derived vector SP (for the hemisphere extent determination) may then be initialised by setting the azimuth and elevation value of each element such that the N audio objects are evenly distributed around a half circle. This can be realised by initializing each audio object direction element within the vector to have an elevation value of zero and an azimuth value of $$q \cdot \frac{180}{N}$$

where q is the index of the associated audio object. Therefore, the vector SP can be written for the N audio objects as:

$$SP = \left(0, 90; 0, 90 - \frac{180}{N}; 0, 90 - \frac{2.180}{N}; \ \ldots \ ; 0, 90 - \frac{(N-1)180}{N}\right)$$

In other words, the SP vector can be initialised so that the directional information of each audio object is presumed to be distributed evenly along a half circle with a unit radius starting at an azimuth value of 90° and extending to −90°.

Similarly where the space utilization is determined to be within a quadrant then the audio object vector generator 252 can be configured to derive a "template" derived vector SP (for the quadrant space utilization determination) initialised by setting the azimuth and elevation value of each element such that the N audio objects are evenly distributed around a quarter circle. This can be realised by initializing each audio object direction element within the vector to have an elevation value of zero and an azimuth value of $$q \cdot \frac{90}{N}$$

where q is the index of the associated audio object. Therefore, the vector SP can be written for the N audio objects as:

$$SP = \left(0, 45; 0, 55 - \frac{90}{N}; 0, 45 - \frac{2.90}{N}; \ \ldots \ ; 0, 45 - \frac{(N-1).90}{N}\right)$$

In other words, the SP vector can be initialised so that the directional information of each audio object is presumed to be distributed evenly along a half circle with a unit radius starting at an azimuth value of 45° and extending to −45°. This can be extended to any suitable extent range. In some embodiments where the extent in azimuth or elevation differs one or the other of the extents may be used to define the template range. Thus for example there may be templates associated with the elevation.

The derived SP vector having elements comprising the derived directions corresponding to each audio object may then be passed to the $1^{st}$ audio object direction rotator 253 in the audio object encoder 121.

The audio object vector generator/rotator 201 can comprise a $1^{st}$ audio object direction rotator 253. The $1^{st}$ audio object direction rotator 253 is configured to receive the derived vector SP and furthermore at least one of the audio object directions. The $1^{st}$ audio object direction rotator 253 is then configured to determine from the direction parameter of the first audio object a rotation angle which orientates the $1^{st}$ audio object with one of the vector elements. The functional block may then rotate each derived direction within the SP vector by the azimuth value of the first component $\phi_0$ from the first received audio object $P_0$. That is each azimuth component of each derived direction within the derived vector SP may be rotated by adding the value of the first azimuth component $\phi_0$ of the first received audio object. In terms of the SP vector this operation results in each element having the following form, $$\hat{SP} = \left(0, 0 + \phi_0; 0, \frac{360}{N} + \phi_0; 0, 2\cdot\frac{360}{N} + \phi_0; \ \ldots \ ; 0, (N-1)\cdot\frac{360}{N} + \phi_0\right).$$

In terms of just solely the azimuth angles, $\hat{SP} = (\hat{\phi}_0; \hat{\phi}_1; \hat{\phi}_2; \ldots ; \hat{\phi}_{N-1})$ where $\hat{\phi}_i$ is the rotated azimuth component given by $$i\cdot\frac{360}{N} + \phi_0$$

and $\hat{SP}$ is the rotated $\hat{SP}$ vector.

As a result of this step the rotated derived vector SP is now aligned to the direction of the first audio object on the unit circle.

A similar rotation of each derived direction within the SP vector by the azimuth value of the first component $\phi_0$ from the first received audio object $P_0$. In some embodiments the first component $\phi_0$ from the first received audio object $P_0$ is the component which is closest to the mean of all of the components. For example $\phi_0$ closest to $\overline{\phi_0,\ldots,\phi_{N-1}}$. That is each azimuth component of each derived direction within the derived vector SP may be rotated such that the mode or one of the two mode vector elements is aligned to the first component. Thus for example rather than using the first object as reference the others can be tried as well and may result in a finer resolution in the quantization, which allows the use of bits for selecting the reference object.

As a result of this step the rotated derived vector $\hat{SP}$ has one element which is aligned to the direction of the first audio object. The rotated derived vector $\hat{SP}$ can in some embodiments then be passed to a difference determiner 257 and furthermore to an audio object repositioner and indexer 255. Additionally the rotation angle can be passed to a quantizer 256.

The audio object vector generator/rotator 201 can comprise a quantizer 256 configured to receive the rotation angle. The quantizer 256 furthermore is configured to quantize the rotation angle. For example, a linear quantizer with a resolution of 2.5 degrees (that is 5 degrees between consecutive points on the linear scale) results in 72 linear quantization levels. It is to be noted that the derived vector SP would be known at both the encoder and decoder because the number of active objects would be fixed at N. if all the sphere space is used for the vector then in some embodiments B2=7 bits can be used to quantize the rotation in the horizontal space (in some embodiments B2=6 bits are used where only one hemisphere is used, and B2=5 bits are used when only a quadrant is used. The quantized rotation angle is also passed to the difference determiner 207.

The audio object vector generator/rotator 201 can also comprise an audio direction repositioner & indexer 255 configured to reorder the position of the received audio objects to align more closely to the derived directions of the elements of the rotated derived vector $\hat{SP}$.

This may be achieved by reordering the position of the audio objects such that the azimuth value of each reordered audio object is aligned with the element position having the closest azimuth value in the rotated derived vector $\hat{SP}$. The reordered positions of each audio object may then be encoded as a permutation index. This process may comprise the following algorithmic steps:

1. Assigning an index to each active audio object in the order received, as a vector this may be expressed as $I=(i_0, i_1, i_2 \ldots i_{N-1})$.

2. Rearrange all but the first index $i_0$, so that an index $i_i$ which is currently in position i is moved to position j if the azimuth angle associated with the audio object $\phi_i$ is closest to the azimuth angle $\hat{\phi}_j$ at position j out of all azimuth angles in the rotated derived vector $\hat{SP}$.

For an example comprising four active audio objects. The SP codevector may be initialised evenly along the unit circle as SP=(0, 0; 0, 90; 0, 180; 0, 270). The directional data associated with the four audio objects:

$((\theta_0, \phi_0); (\theta_1, \phi_1); \ldots (\theta_{N-1}, \phi_{N-1}))$, may be received as:

((0, 130); (0, 210); (0, 39); (0,310), in which the first $\phi_0$ is given as 130 degrees. In this particular example the rotated azimuth angles in the vector $\hat{SP}$ are given by (0+130, 90+130, 180+130, 270+130)=(130; 220; 310; 400)=(130, 220, 310, 40). In this example the second audio object with azimuth angle 210 closest to the second azimuth angle in the vector $\hat{SP}$, the third audio object with azimuth angle 30 is closest to the fourth azimuth angle in the vector $\hat{SP}$ and the fourth audio object with azimuth angle 310 is closest to the third azimuth angle in the vector $\hat{SP}$. Therefore, in this case the reordered audio object index vector is $\hat{I}=(i_0,i_1,i_3,i_2)$.

3. The reordered audio object index vector may then be indexed according to the particular permutation of the indices within the vector. Each particular permutation of indices within the vector may be assigned an index value. However, it is to be understood that the first index position of the reordered audio object index vector is not part of the permutation of indices as the index of the first element in the vector does not change. That is first audio object always remains in the first position because this is the audio object towards which the derived vector SP is rotated. Therefore, there are a possible (N−1)! permutations of indices of the reordered audio object index vector which can be represented within the bounds of $\log_2((N-1)!)$ bits.

Returning to the above example of a system having 4 active audio objects it is only the indices of $i_3$, $i_1$, $i_2$ that need to be indexed. The indexing for the possible permutations of indices of the reordered audio object index vector for the above demonstrative example may take the following form

| Index | order of indices of re ordered audio objects |
|---|---|
| 0 | $i_1, i_2, i_3$ |
| 1 | $i_1, i_3, i_2$ |
| 2 | $i_2, i_1, i_3$ |
| 3 | $i_2, i_3, i_1$ |
| 4 | $i_3, i_1, i_2$ |
| 5 | $i_3, i_2, i_1$ |

Therefore, to summarize the rotated derived vector $\widehat{SP}$ can be encoded for transmission by quantizing the azimuth of the first object $\phi_0$. Additionally the positions of the ordered active audio object positions are required to be transmitted as well. The permutation index can for example be encoded using B3 bits, where the Index, $I_{ro}$ representing the order of indices of the audio direction parameters of the audio objects 1 to N−1 can form part of an encoded bitstream such as that from the encoder 121.

In some embodiments the difference determiner 205 can comprise a vector element difference determiner 257. The vector element difference determiner 257 is configured to receive the rotated derived vector $\widehat{SP}$ the quantized rotation angle and the indexed audio object positions and determine a difference vector between the rotated derived $\widehat{SP}$ vector and the directional data of each audio object. In some embodiments the directional difference vector can be a 2-dimensional vector having an elevation difference value and an azimuth difference value. In some embodiments the azimuth difference value is furthermore evaluated with respect to the difference between the rotated derived vector and the quantized rotation angle. In other word the difference takes into account the quantization of the rotation angle to reflect the difference between the indexed audio position and the quantized rotation rather than the indexed audio position and the rotation.

For instance, the directional difference vector for an audio object $P_i$ with directional components $(\theta_i, \phi_i)$ can be found as $$(\Delta\theta_i,\Delta\phi_i)=(\theta_i-\hat{\phi}_i,\phi_i-\hat{\phi}_l q)$$

Where $\hat{\phi}_l q$ is the quantized rotation angle.

In practice however, $\Delta\theta_i$ may be $\theta_i$ because the elevation components of the above SP codevector are zero. However, it is to be understood that other embodiments may derive a vector SP in which the elevation component is not zero, in these embodiments an equivalent rotation change may be applied to the elevation component of each element of the derived vector SP. That is the elevation component of each element of the derived vector SP may be rotated by (or aligned to) the first audio object's elevation.

It is to be understood that the directional difference for an audio object $P_i$ is formed based on the difference between each element of the rotated derived vector $\widehat{SP}$ and the corresponding reordered (or repositioned) audio object direction.

It is to be further understood that the above description has been laid out in terms of repositioning (or rearranging) the order of the audio objects however the above description is equally valid for the repositioning of just the audio direction parameters rather than the repositioning of the whole audio objects. The difference vector may then be passed to a (spherical) quantizer & indexer 259.

In some embodiments the quantizer and encoder 213 can comprise a quantizer resolution determiner 258. The quantizer resolution determiner 258 is configured to receive the bits used to encode the spatial extent (B0), the encoded space utilization (B1) the encoded permutation index (B3) and encoded difference values (B4). Additionally in some embodiment the quantizer resolution determiner 208 is configured to receive the indication of the audio object spatial extents (the dispersion of the audio objects). In some embodiments the quantizer resolution determiner 258 is then configured to determine a suitable quantization resolution which is provided to the (spherical) quantizer & indexer 259.

Figure 3:
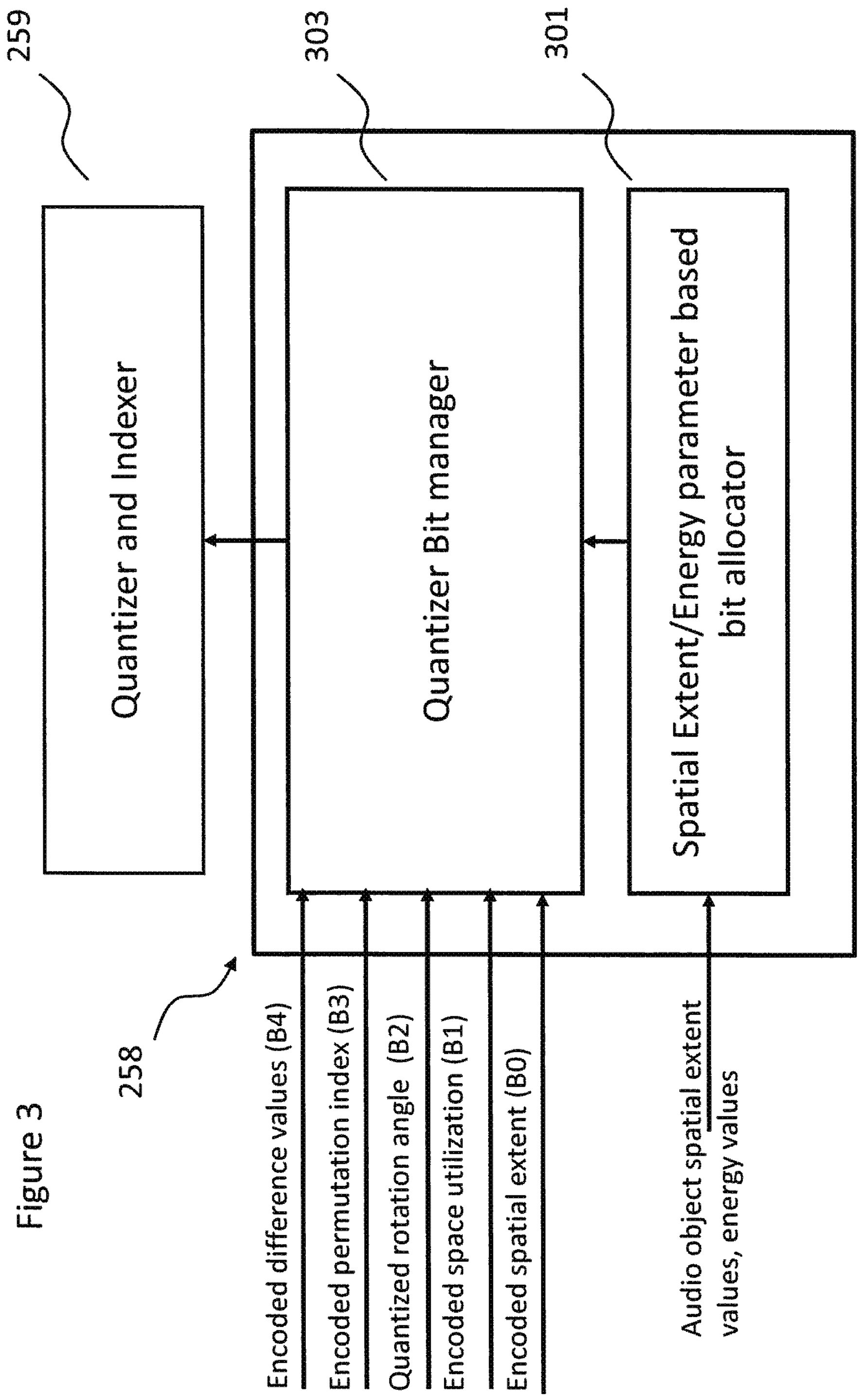
FIG. 3 shows schematically a quantizer resolution determiner as shown in FIG. 2*b* according to some embodiments.

With respect to FIG. 3 an example quantizer resolution determiner 258 is shown in further detail. The quantizer resolution determiner 258 as shown in FIG. 3 in some embodiments comprises a spatial extent/energy parameter bit allocator 301. The spatial extent/energy parameter bit allocator 301 can be configured to receive the audio object spatial extent values (which describes the spatial extent of each of the audio objects) and determine an (initial) quantization resolution value for the quantization of the difference value between the element of the rotated vector associated with the audio object and the audio object. For example in some embodiments the (initial) quantization resolution value can be a first quantization level when the spatial extent (the perception of the "size" or "range" of the audio object) is a first value and then a second quantization level when the spatial extent is a second value. In some embodiments for larger values of the spatial extent, lower quantization resolution levels are determined to be used for the angle difference quantization. This is because the directional errors are perceived differently for different spatial extents whereas the spatial extent progresses from 0 degrees (a point source) to 180 degrees (a hemisphere source) then the directional error in order to perceived increases.

In some embodiments the determination may be based on a look-up table or other formulation such as:

| Spatial extent | Number of bits for angle difference values |
|---|---|
| 0 | 11 |
| 5 | 10 |
| 10 | 9 |
| 20 | 8 |
| 30 | 8 |
| 40 | 7 |
| 50 | 6 |
| 60 | 6 |
| 90 | 5 |
| 120 | 4 |
| 180 | 0 |

The number of bits shown above may be based on a cumulated number of bits for both azimuth and elevation quantization. The values in the table are given as example and may be adjusted (dynamically) depending on the total bitrate of the codec.

Furthermore in some embodiments the spatial extent/energy parameter bit allocator 301 can be configured to modify the quantization level based on audio signal (energy/power/amplitude) levels associated with the audio object. Thus for example the quantization resolution can be lowered where the signal level is lower than a determined threshold or increased where the signal level is higher than a determined threshold. These determined thresholds may be static or dynamic and may be relative to the signal levels for each audio object. In some embodiments the signal level is estimated using the energy of the signal as given by the mono codec for the object multiplied by the gain of the considered audio object.

In some embodiments the spatial extent/energy parameter bit allocator 301 can output the number of bits to be used to a quantizer bit manager 303.

The quantizer resolution determiner 258 as shown in FIG. 3 in some embodiments comprises a quantizer bit manager. The quantizer bit manager is configured to receive the number of bits used for the encoded difference values (B4), the encoded permutation index (B3), the quantized rotation angle (B2), the encoded space utilization (B1) and the encoded spatial extents (B0) and compare these against an available number of bits for the object metadata.

When the number of bits used is more than the available number of bits for the object metadata then the quantization resolution number of bits used can be reduced. In some embodiments the reduction of the quantization resolution can be performed such that the resolution is reduced gradually by 1 bit (for instance) starting with an object having a lower signal level (which can for example be determined by a signal energy multiplied by the gain), until the available number of bits for metadata is reached.

The managed bits value for the quantization resolution can then be output to the quantizer and indexer 259.

In some embodiments the quantizer and encoder 213 can comprise a (spherical) quantizer & indexer 259. The (spherical) quantizer & indexer 259 may in some embodiments furthermore receive the directional difference vector ($\Delta\theta_i$, $\Delta\phi_i$) associated with each audio object and quantize these values using a suitable quantization operation based on the quantization resolution provided by the quantization resolution determiner 258. Thus for each object directional differences with respect to the components of the rotated super-codevector $\widehat{SP}$ are calculated. The differences can be quantized in the spherical grid corresponding to 11 bits (for 2.5 degrees resolution) by assigning the azimuth difference to the elevation components and the elevation difference to the elevation component. Alternatively in some embodiments the quantization of the differences can be implemented with a scalar quantizer for each component.

Figure 4:
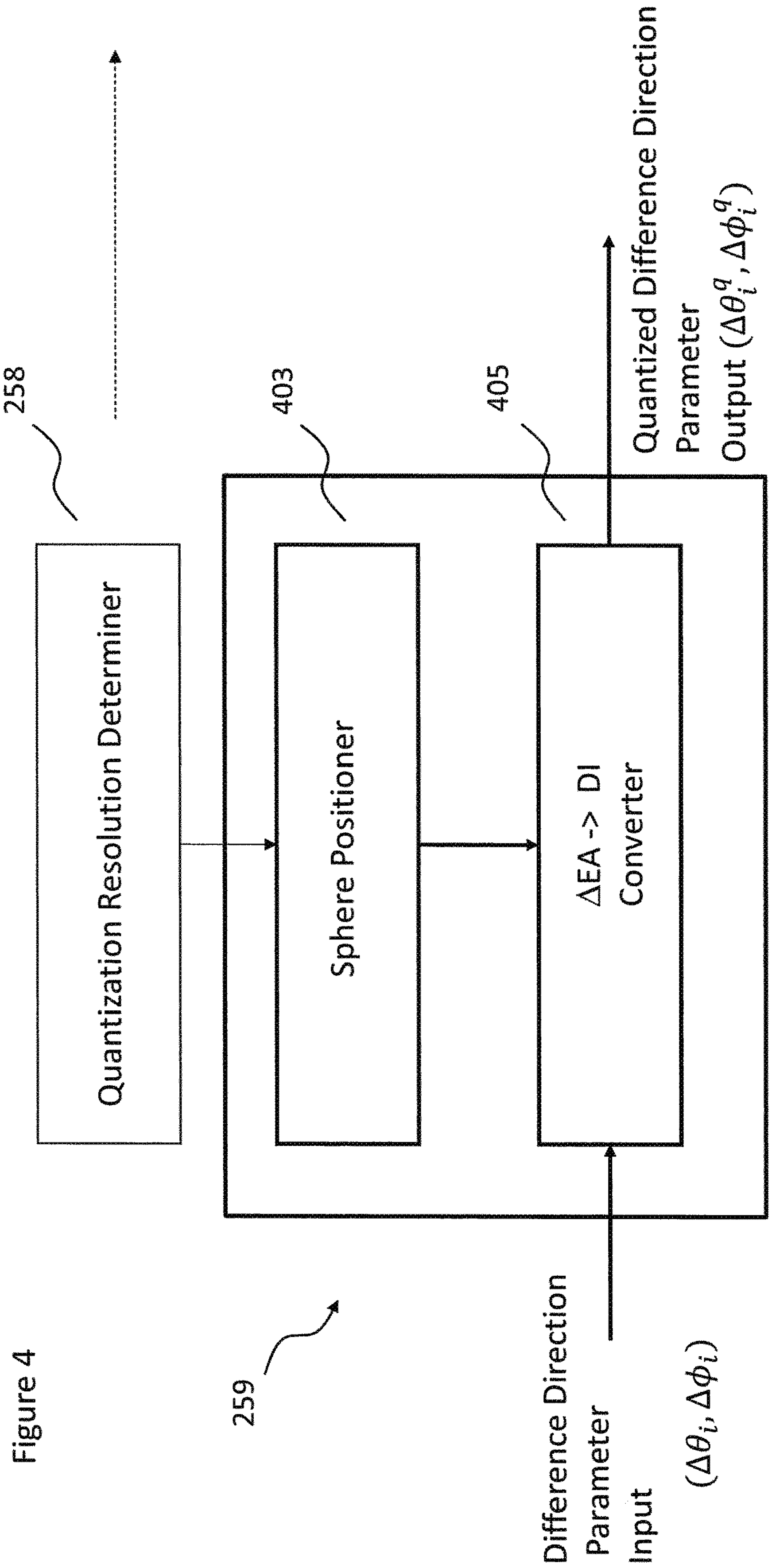
FIG. 4 shows schematically a spherical quantizer & indexer implemented as shown in FIG. 2*b* according to some embodiments.

An example (spherical) quantizer & indexer 259 is shown in more detail in FIG. 4 where the directional difference vector is shown as being passed to the spherical quantizer 259.

The following section describes a suitable spherical quantization scheme for indexing the directional difference vector ($\Delta\theta_i$, $\Delta\phi_i$) for each audio object.

In the following text the input to the quantizer is generally referred to as ($\theta$,$\phi$) in order to simplify the nomenclature and because the method can be used for any elevation azimuth pair.

The quantizer & indexer 259 in some embodiments comprises a sphere positioner 403. The sphere positioner is configured to configure the arrangement of spheres based on the quantization resolution value from the quantization determiner. The proposed spherical grid uses the idea of covering a sphere with smaller spheres and considering the centres of the smaller spheres as points defining a grid of almost equidistant directions.

Figure 5:
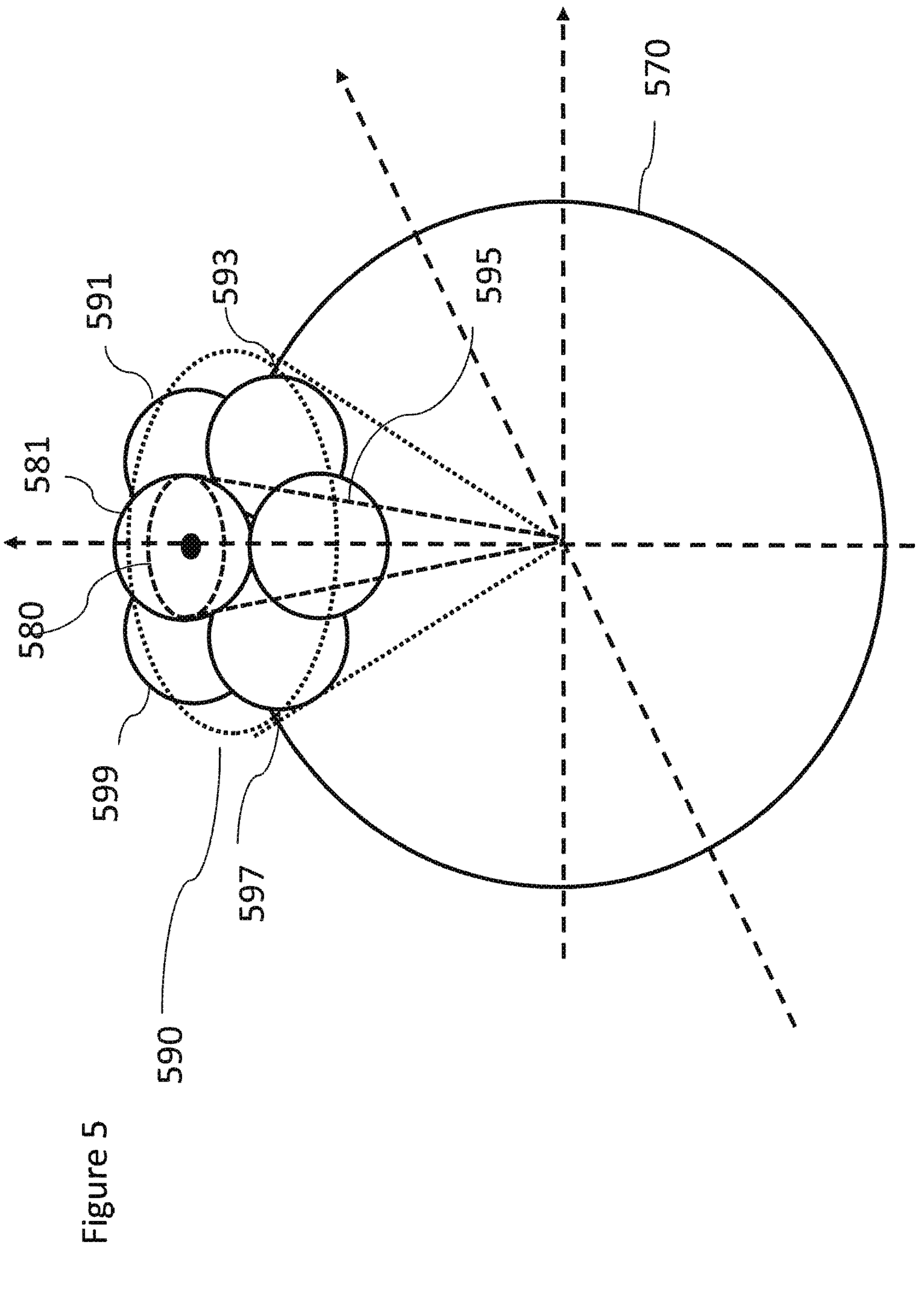
FIG. 5 shows schematically example sphere location configurations as used in the spherical quantizer & indexer and the spherical de-indexer as shown in FIG. 4 according to some embodiments.

The sphere may be defined relative to the reference location and a reference direction. The sphere can be visualised as a series of circles (or intersections) and for each circle intersection there are located at the circumference of the circle a defined number of (smaller) spheres. This is shown for example with respect to FIG. 5. For example, FIG. 5 shows an example 'polar' reference direction configuration which shows a first main sphere 570 which has a radius defined as the main sphere radius. Also shown in FIG. 5 are the smaller spheres (shown as circles) 581, 591, 593, 595, 597 and 599 located such that each smaller sphere has a circumference which at one point touches the main sphere circumference and at least one further point which touches at least one further smaller sphere circumference. Thus, as shown in FIG. 5 the smaller sphere 581, touches main sphere 570 and smaller spheres 591, 593, 595, 597, and 599. Furthermore, smaller sphere 581 is located such that the centre of the smaller sphere is located on the +/−90 degree elevation line (the z-axis) extending through the main sphere 570 centre.

The smaller spheres 591, 593, 595, 597 and 599 are located such that they each touch the main sphere 570, the smaller sphere 581 and additionally a pair of adjacent smaller spheres. For example the smaller sphere 591 additionally touches adjacent smaller spheres 599 and 593, the smaller sphere 593 additionally touches adjacent smaller spheres 591 and 595, the smaller sphere 595 additionally touches adjacent smaller spheres 593 and 597, the smaller sphere 597 additionally touches adjacent smaller spheres 599 and 591, and the smaller sphere 599 additionally touches adjacent smaller spheres 597 and 591.

The smaller sphere 581 therefore defines a cone 580 or solid angle about the +90 degree elevation line and the smaller spheres 591, 593, 595, 597 and 599 define a further cone 590 or solid angle about the +90 degree elevation line, wherein the further cone is a larger solid angle than the cone.

In other words the smaller sphere 581 (which defines a first circle of spheres) may be considered to be located at a first elevation (with the smaller sphere centre +90 degrees), and the smaller spheres 591, 593, 595, 597 and 599 (which define a second circle of spheres) may be considered to be located a second elevation (with the smaller sphere centres<90 degrees) relative to the main sphere and with an elevation lower than the preceding circle.

This arrangement may then be further repeated with further circles of touching spheres located at further elevations relative to the main sphere and with an elevation lower than the preceding circles.

The sphere positioner 403 thus in some embodiments be configured to perform the following operations to define the directions corresponding to the covering spheres:

Input: angle resolution for elevation, $\partial\theta$ $\left(\text{ideally such that } \frac{\pi}{2\,\partial\theta} \text{ is integer}\right)$ -continued Output: number of circles, Nc, and number of points on each circle, n(i), i =0, Nc−1

1. n(0) = 1
2. $M = \left[\frac{\pi}{2\,\partial\theta}\right]$
3. For i =1:M−1
   a. $n(i) = \pi\sin(\partial\theta\cdot i)/\sin\frac{\partial\theta}{2}$
   b. $\theta(i) = \frac{\pi}{2} - i\cdot\partial\theta$ (elevation)
   c. $\partial\phi(i) = 2\pi/n(i)$
   d. If i is odd
      i. $\phi_i(0) = 0$
   e. Else
      i. $\phi_i(0) = \frac{\partial\phi(i)}{2}$ (first azimuth value on circle $i$)
   f. End if
4. End for Thus, according to the above the elevation for each point on the circle i is given by the values in θ(i). For each circle above the Equator there is a corresponding circle under the Equator (the plane defined by the X-Y axes).

Furthermore, as discussed above each direction point on one circle can be indexed in increasing order with respect to the azimuth value. The index of the first point in each circle is given by an offset that can be deduced from the number of points on each circle, n(i). In order to obtain the offsets, for a considered order of the circles, the offsets are calculated as the cumulated number of points on the circles for the given order, starting with the value 0 as first offset.

In other words, the circles are ordered starting from the "North Pole" downwards.

In another embodiment the number of points along the circles parallel to the Equator $$n(i) = \pi\sin(\partial\theta\cdot i)/\sin\frac{\partial\theta}{2}$$

can also be obtained by $$n(i) = \pi\sin(\partial\theta\cdot i)/\left(\lambda_i\sin\frac{\partial\theta}{2}\right),$$

where $\lambda_i \geq 1$, $\lambda_i \leq \lambda_{i+1}$. In other words, the spheres along the circles parallel to the Equator have larger radii as they are further away from the North pole, i.e. they are further away from North pole of the main direction.

The sphere positioner having determined the number of circles and the number of circles, Nc, number of points on each circle, n(i), i=0, Nc−1 and the indexing order can be configured to pass this information to an ΔEA to DI converter 405.

The transformation procedures from (elevation/azimuth) (ΔEA) to direction index (DI) and back are presented in the following paragraphs.

The quantizer and indexer 259 in some embodiments comprises a delta elevation-azimuth to direction index (ΔEA-DI) converter 405. The delta elevation-azimuth to direction index converter 305 in some embodiments is configured to receive the difference direction parameter input direction parameter input $(\Delta\theta_i, \Delta\phi_i)$ and the sphere positioner information and convert the difference direction (elevation-azimuth) value to a difference direction index by quantizing the difference direction value.

The quantized difference direction parameter index $I_d = (\Delta\theta_i^q, \Delta\phi_i^q)$ may be output to an entropy/fixed rate encoder 260.

In some embodiments the quantizer and encoder 213 comprises an entropy/fixed rate encoder 260. The entropy/fixed rate encoder 260 is configured to receive the quantized difference direction parameter index $I_d = (\Delta\theta_i^q, \Delta\phi_i^q)$ and encode these values in a suitable manner. In some embodiments the quantized difference direction parameter index $I_d = (\Delta\theta_i^q, \Delta\phi_i^q)$ for each object is entropy encoded (for example using a Golomb Rice mean removed encoding) and furthermore using a fixed rate encoding. The entropy/fixed rate encoder 260 may then be configured to determine which of the methods uses the fewer number of bits and chooses this method and furthermore signals this selection as well as the encoded quantized difference direction parameter index $I_d = (\Delta\theta_i^q, \Delta\phi_i^q)$ values.

With respect to FIGS. **6*b* and 6*c* is shown a flow diagram showing the operations of the audio object encoder 121** with respect to the vector element difference encoding operations.

The first operation may be the receiving/obtaining of the audio object parameters (such as directions, spatial extent and energy) as shown in FIG. **6*b* by step 651**.

The spatial extents of the audio objects can then be encoded (B0 bits) as shown in FIG. **6*b* by step 653**.

The space utilization can then be determined as shown in FIG. **6*b* by step 655**.

The space utilization can then be encoded (B1 bits) as shown in FIG. **6*b* by step 657**.

Then the audio object vector can be determined based on the space utilization as shown in FIG. **6*b* by step 659**.

The audio object vector can then be rotated based on the 1st audio object direction as shown in FIG. **6*b* by step 661**.

The rotation angle can then be quantized as shown in FIG. **6*b* by step 663**.

The quantized rotation angle can then be encoded (B2 bits) as shown in FIG. **6*b* by step 665**.

Following the rotation of the audio object vector the positions of the audio objects can be arranged to have an order such that the arranged azimuth values of the audio objects correspond to the closest to the azimuth values of the derived directions as shown in FIG. **6*b* by step 667**.

The re-positioned audio objects can be indexed and the permutation of the indices can be encoded (B3 bits) as shown in FIG. **6*b* by step 669**.

The directional difference between each repositioned audio direction parameter and the corresponding rotated derived direction parameter (taking account of the quantization of the rotation angle) can then be formed as shown in FIG. **6*b* by step 671**.

A quantization resolution based on audio object parameters (spatial extent, energy) and comparison of bits used/bit available can then be determined as shown in FIG. **6*c* by step 673**.

Then the directional difference between each repositioned audio direction parameter and the corresponding rotated derived direction parameter can be quantized as shown in FIG. **6*c* by step 675**.

Figure 6C:
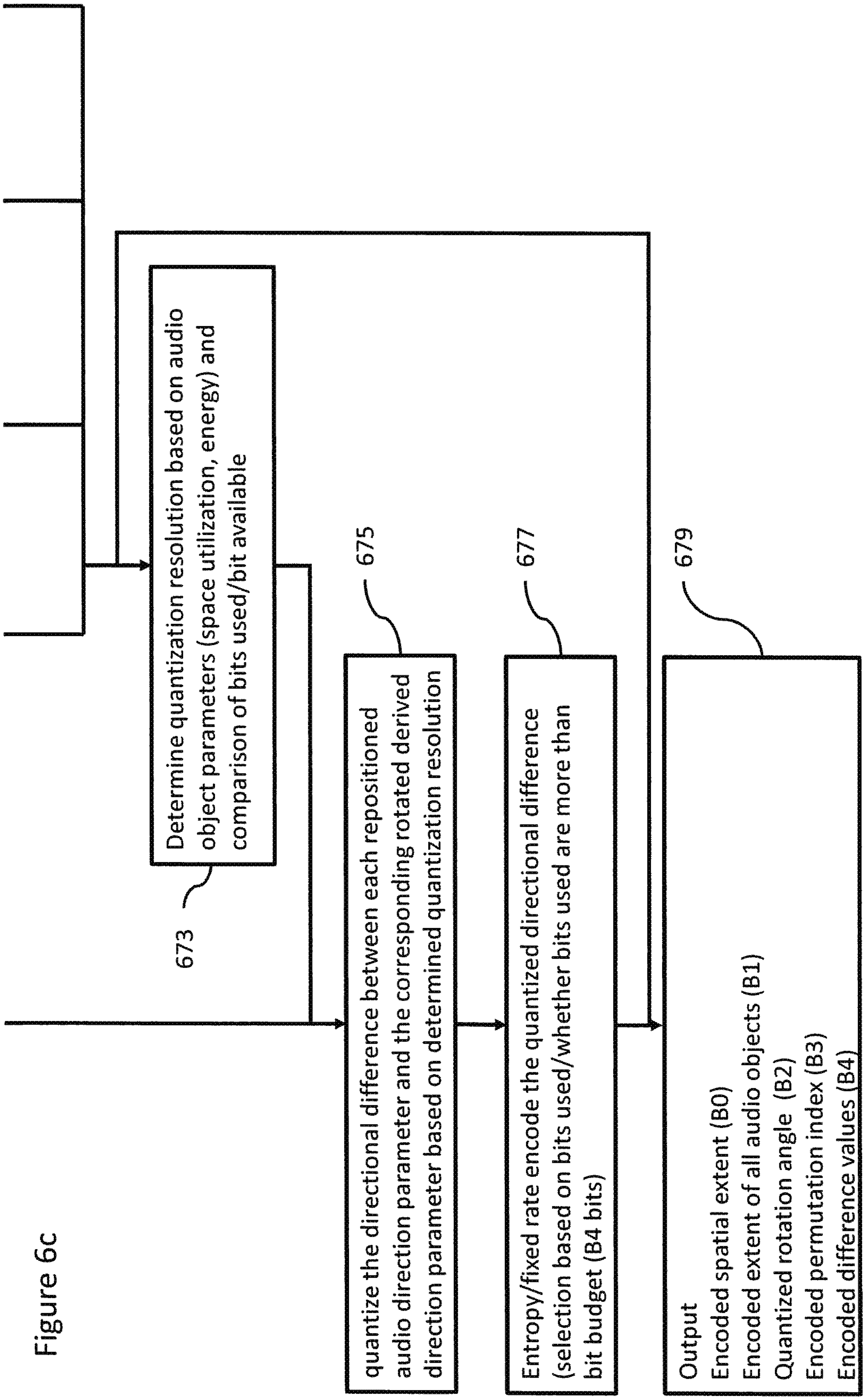

The quantized directional difference can then be encoded using a suitable encoding, for example using an entropy encoding or fixed rate encoding where a selection is based on bits used/whether the number of bits used are more than bit budget (B4 bits) as shown in FIG. 6*c* by step 677.

The method may then output the encoded spatial extent (B0), encoded extent of all audio objects (B1), quantized rotation angle (B2), encoded permutation index (B3) and encoded difference values (B4).

An example encoding algorithm may thus be summarized as:

1. Encode the spatial extent using B0 bits
2. Check spatial utilization, if the objects are situated in the entire space, or only in one hemisphere, or maybe only in quarter of the space. Encode this info with B1 = 1 or 2 bits.
3. Calculate the super-codevector rotation such that the quantization is minimized
4. Quantize the rotation angle with a number of bits depending on the choice of the super-codevector (if all the space is used, then use B2=7 bits for rotation in the horizontal space, B2=6 bits only one hemisphere is used)
5. Encode the permutation corresponding to the order of the last N-1 objects.
6. Encode the rotation angle jointly with the permutation index with B3 bits
7. Calculate for all active objects the direction differences (elevation and azimuth) with respect to the components of the rotates super-codevector
8. Set the number of bits to be used for the differences as B4_i, for each object i, given in Table 1, based on the spatial extent value of each object.
9. If B1 + B3 + B4 + 1 + B0 > available number of bits for the object metadata
    a. Further reduce the number of bits B4_i gradually by 1 bit (for instance) starting with the objects having the lower signal level (signal energy multiplied by the gain), until the available number of bits for metadata is reacher.
10. End
11. Find maximum K objects, "i" that have not used differential encoding at frame "j-1" and for which the difference with respect to the previous frame is smaller than a threshold.
12. Quantize the inter-frame angle difference of the objects "i" using the scalar quantizers of the spherical grid quantizer
13. Quantize the angle differences of the all objects using the scalar quantizers or the spherical grid quantizer
14. Update the permuation and permutation index from point 5 to reflect only the objects that are not using DE and estimate the mean removed GR encoding bits when the objects "i" are using DE, Bits_DE
15. Estimate the mean removed GR encoding bits when no DE is used, Bits
16. If Bits_DE<Bits,
    a. use DE
    b. add a bit to signal,
    c. store the fact that for frame "j" the objects "i" have used DE (which objects from those that were allowed to use DE based on the DE usage at preceding frames.
    d. update the permutation and permutation index from point 5 to reflect only the objects that are not using DE
17. Else
    a. use the scalar quantizers or the spherical grid quantizer
    b. send 1 bit to signal.
    c. store the fact that for frame "j" the objects "i" have not used DE
18. End
19. If the number of bits resulted from the entropy encoding is larger than B4
    a. Use B4_i bits for fixed rate encoding the differences (using the scalar quantizers, or the spherical grid quantizer) and add 1 bit for signaling
    b. Store the fact that no DE has been used (no_DE for each object)
20. Else
    a. Use the entropy coding and add a bit for signaling
21. End In principle the spatial extent relates mostly to the horizontal direction and is less perceived on the vertical one. Should both a vertical and horizontal spatial extent be defined and sent, the angle resolution of the differences can be adjusted separately for the azimuth and the elevation.

The maximum number of objects that can use simultaneously DE is higher at lower overall bitrates. For instance at bitrates within the range 24.4 kbps K=4, at 32 kbps, K=3; at 48 kbps, K=2, and K=1 for higher bitrates, until a maximum bitrate where no DE is allowed.

Figure 7A:
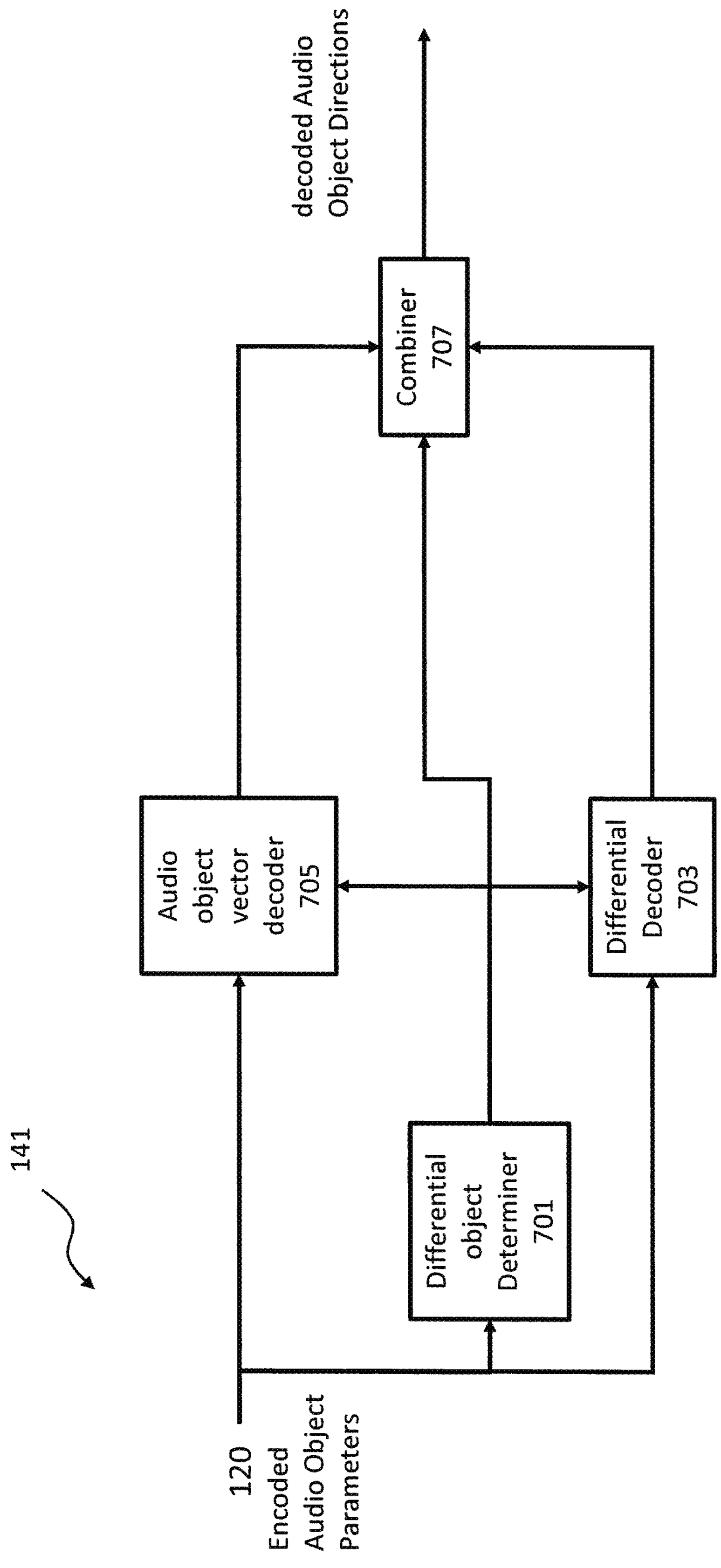
FIGS. 7*a* and 7*b* show schematically the audio object decoder as shown in FIG. 1 according to some embodiments.

With respect to FIG. 7*a* there is shown an audio object decoder 141 as shown in FIG. 1. As can be seen the audio object decoder 141 can be arranged to receive from the encoded bitstream the encoded spatial extent (B0), encoded extent of all audio objects (B1), quantized rotation angle (B2), encoded permutation index (B3) and encoded difference values (B4).

The audio object decoder 141 in some embodiments comprises a differential object determiner 701. The differential object determiner 701 is configured to determine any objects which have been encoded using differential encoding (in other words frame by frame encoding). Having determined which objects are differentially encoded then this can be signalled to a differential decoder 703 and audio object vector decoder 705 and the combiner 707.

The audio object decoder 141 in some embodiments comprises an audio object vector decoder 705. The audio object vector decoder 705 is configured to receive the encoded audio object parameters and decode the audio object parameters and specifically the audio object directions which have been encoded using the vector difference method. The output of the audio object vector decoder 705 is configured to output the audio object directions to the combiner 707.

The audio object decoder 141 in some embodiments comprises a differential decoder 703. The differential decoder 703 is configured to receive the encoded audio object parameters and decode the audio object parameters and specifically the audio object directions which have been encoded using the frame differential encoding method. The output of the differential decoder 703 is configured to output the audio object directions to the combiner 707.

The audio object decoder 141 in some embodiments comprises a combiner 707 configured to receive the decoded audio objects which can then be combined before being output as the decoded audio object directions.

The combiner 707 furthermore in some embodiments can be configured to handle error resilience. Thus for example, when a frame is lost, in some embodiments the combiner 707 is configured to use the value of the previous frame. However, in some embodiments where the combiner determined that for the last M frames a constant, or approximately constant speed of the object has been estimated, the recovered position can be calculated using the estimated speed and the previous frame object position. The same recovery mechanism can be applied when recovering the directional information for a frame after a frame loss, and for which the differential encoding has been used.

This can for example be summarised as:

1. If previous frame is lost and current object has been coded using DE
    a. If (approximately) constant speed detected for last M frames
        i. Estimate position based on speech and previous frame position. The previous frame position of the object has been estimated using the same idea. (In other words an extrapolation of available previous frame positions)
    b. Else
        i. Estimate based on rotated super-codevector component
    c. Else
2. Else
    a. Decode normally
3. End With respect to FIG. 8*a* is shown the operation of the decoder shown in FIG. 7*a*.

Figure 8A:
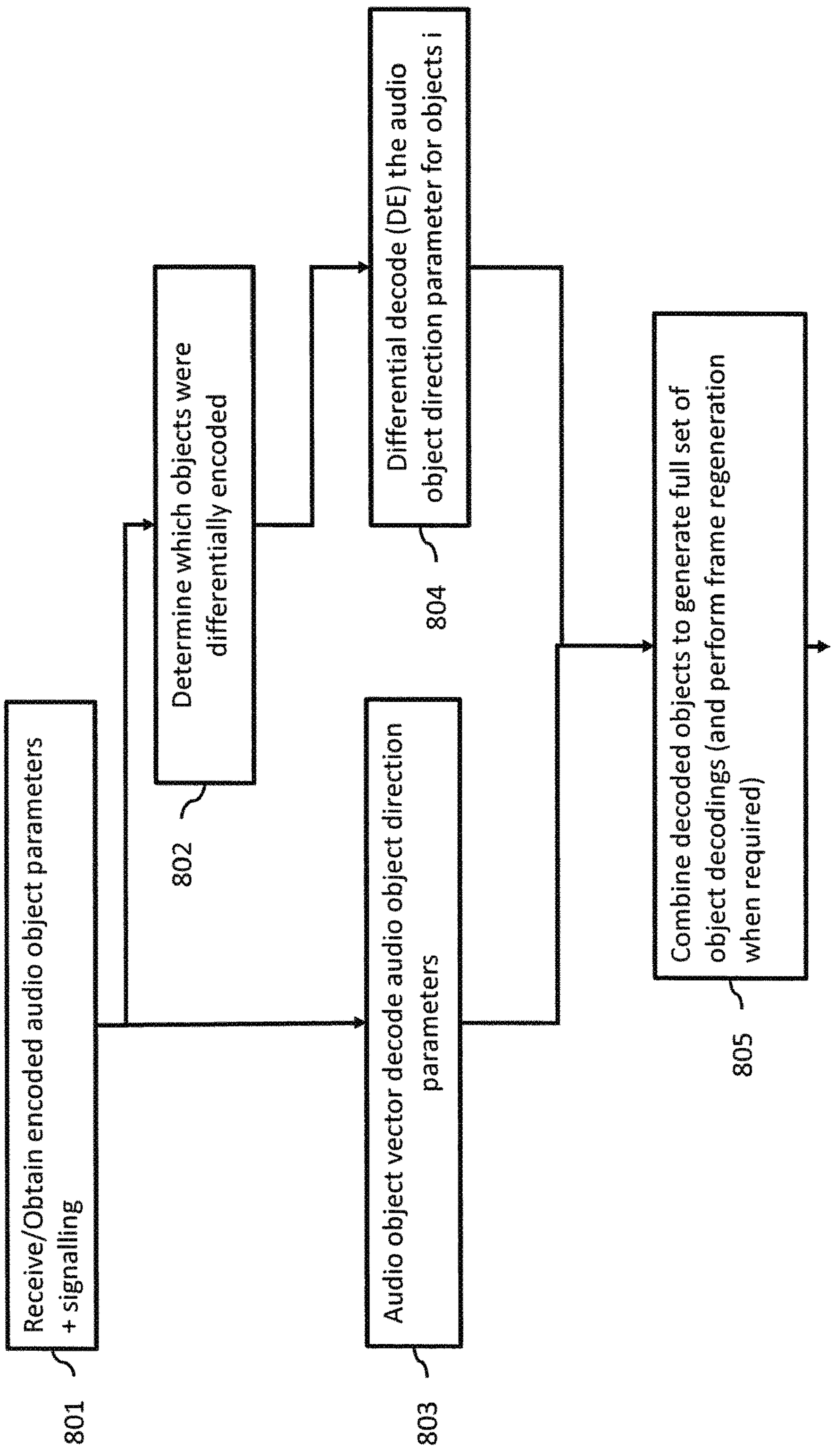
FIGS. 8*a* and 8*b* show flow diagrams of the operation of the audio object decoder as shown in FIGS. 7*a* and 7*b* according to some embodiments.

The method may further comprise receiving/obtaining the encoded audio object parameters+signalling as shown in FIG. 8*a* by step 801.

A further operation is one of determining which objects were differentially encoded as shown in FIG. 8*a* by step 802.

The objects which were differentially encoded can then be differentially decoded as shown in FIG. 8*a* by step 804.

The objects which were not differentially encoded can be audio object vector decoder as shown in FIG. 8*a* by step 803.

The decoded objects can then be combined (and missing frame information regenerated) as shown in FIG. 8*a* by step 805.

Figure 7B:
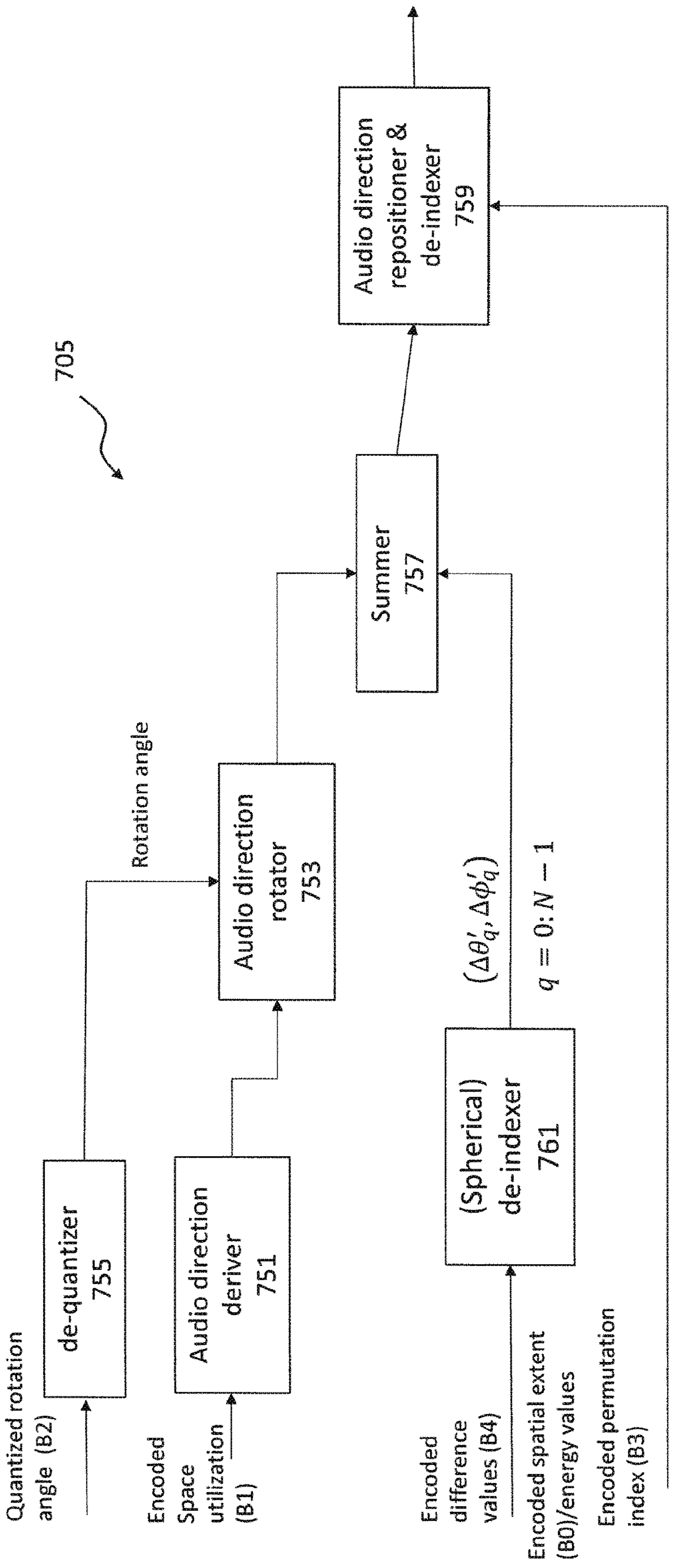

With respect to FIG. 7*b* an audio object decoder 141 from the viewpoint of the vector decoding process is described in further detail. The audio object decoder 141 in some embodiments comprises a dequantizer 755. The dequantizer 755 is configured to receive the quantized/encoded rotation angle and generate a rotation angle which is passed to an audio direction rotator 753.

The audio object decoder 141 in some embodiments comprises an audio direction deriver 751. The audio object decoder 141 can comprise an audio direction deriver 751 which has the same function as the audio object vector generator at the encoder 121. In other words, audio direction deriver 751 can be arranged to form and initialise an SP vector in the same manner as that performed at the encoder. That is each derived audio direction component of the SP vector is formed under the premise that the directional information of the audio objects can be initialised as a series of points evenly distributed along the circumference of a unit circle starting at an azimuth value of 0°. The SP vector containing the derived audio directions may then be passed to the audio direction rotator 753. Thus the audio direction deriver 751 is configured to receive the encoded extent of all audio objects (B1) and from this determine a "template" or derived direction vector in the same manner as described in the encoder. The vector SP can then be passed to the audio direction rotator 753.

The audio object decoder 141 in some embodiments comprises an audio direction rotator 753. The audio direction rotator 753 is configured to receive the (SP) audio direction vector and the quantized rotation angle and rotate the audio directions to generate a rotated audio direction vector which can be passed to the summer 757.

The audio object decoder 141 in some embodiments comprises a (spherical) de-indexer 761. The (spherical) de-indexer 761 is configured to receive the encoded difference values and generate decoded difference values by applying a suitable decoding and deindexing. The decoded difference values can then be passed to the summer 757.

The audio object decoder 141 in some embodiments comprises a summer 757. The summer 757 is configured to receive the decoded difference values and the rotated vector to generate a series of object directions which are passed to an audio direction repositioner and deindexer 759. The quantised directional vector for each audio object can for example be formed by summing for each audio object $P_q$ q=0:N−1 the quantised directional vector $(\Delta\theta'_q, \Delta\phi'_q)$ with the corresponding rotated derived audio direction 0, $$q \cdot \frac{360}{N} + \phi'_0$$

(worn the dequantized rotated derived audio direction "template" vector $\widehat{SP'}$.) This can be expressed as.

$$(\Delta\theta'_q, \Delta\phi'_q) = (\Delta\theta_q' + \hat{\theta}_q', \Delta\phi_q' + \widehat{\phi_q}')\, q = 0{:}\ N-1$$

For those embodiments in which a rotation is produced for just the azimuth value, that is the elevation component is 0 for each element of the "template" codevector SP the above equation reduces to $$(\Delta\theta'_q, \Delta\phi'_q) = (\Delta\theta_q', \Delta\phi_q' + \widehat{\phi_q}')\, q = 0{:}\ N-1$$

The audio object decoder 141 in some embodiments comprises an audio direction repositioner and deindexer 759. The audio direction repositioner and deindexer 759 is configured to receive the object directions from the summer 757 and the encoded permutation indices and from this output a reordered audio object direction vector which can then be output. In other words in some embodiments the audio direction de-indexer and re-positioner 709 can be configured to decode the index $I_{ro}$ in order to find the particular permutation of indices of the re-ordered audio directions. This permutation of indices may then be used by the audio direction de-indexer and re-positioner 759 to reorder the audio direction parameters back to their original order, as first presented to the audio object encoder 121. The output from audio direction de-indexer and re-positioner 759 may therefore be the ordered quantised audio directions associated with the N audio objects. These ordered quantised audio parameters may then form part of the decoded multiple audio object stream 140.

Figure 8B:
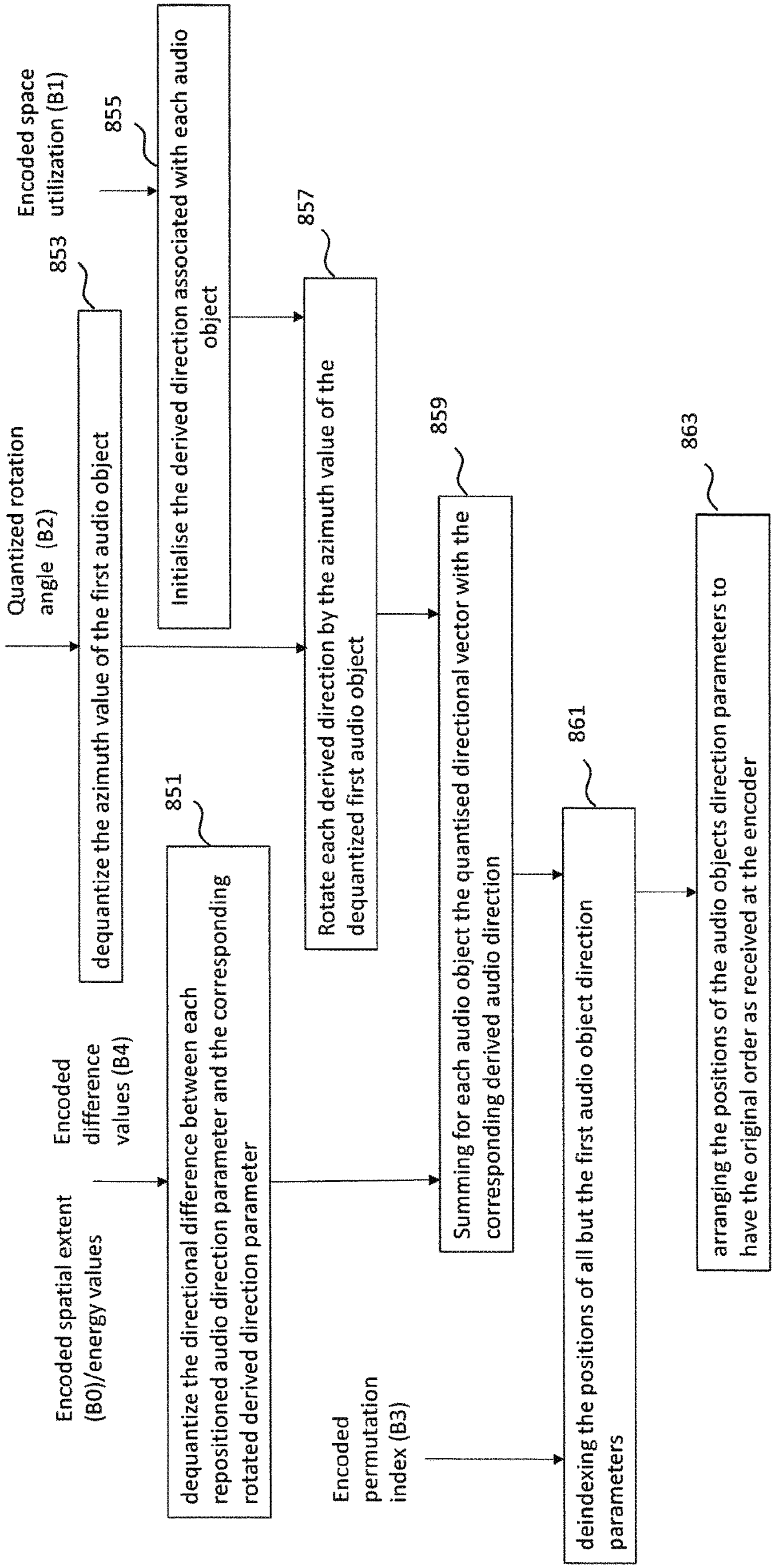

Associated with FIG. 7*b* there is FIG. 8*b* which depicts the processing steps of the audio object decoder 141.

The step of dequantizing the directional difference between each repositioned audio direction parameter and the corresponding rotated derived direction parameter (based on the quantization resolution determined in the manner similar to the encoder) is depicted in FIG. 8*b* as processing step 801.

The step of dequantising the azimuth value of the first audio object is shown as processing step 853 in FIG. 8*b*.

With reference to FIG. 8*b* the step of initialising the derived direction associated with each audio object is shown as processing step 855.

With reference to FIG. 8*b* the processing step 857 represents the rotating of each derived direction by the azimuth value of the dequantized first audio object.

The processing step of summing for each audio object $P_q$ q=0: N−1 the quantised directional vector ($\Delta\theta'_q$, $\Delta\phi'_q$) with the corresponding rotated derived audio direction is shown in FIG. 8*b* as step 859.

The step of deindexing the positions of all but the first audio object direction parameters is shown as processing step 861 in FIG. 8*b*.

The step of arranging the positions of the audio objects direction parameters to have the original order as received at the encoder is shown as processing step 863 in FIG. 8*b*.

Figure 9:
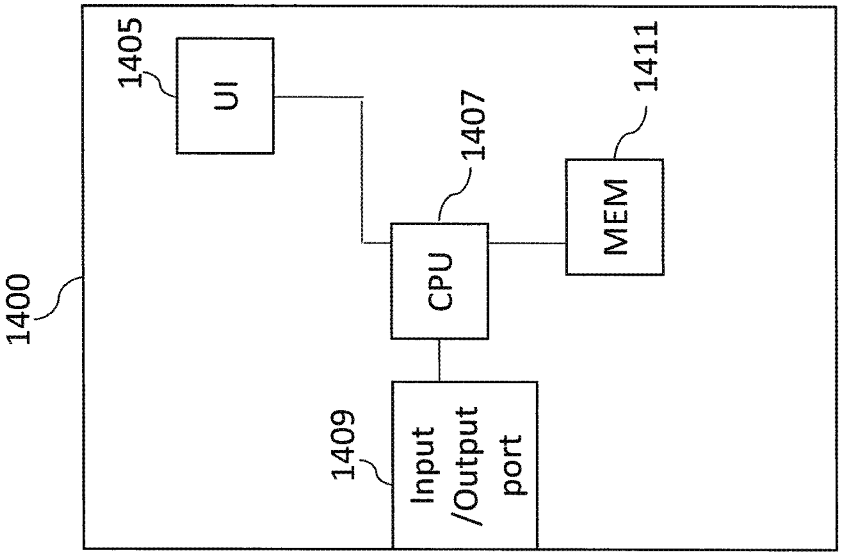
FIG. 9 shows schematically an example device suitable for implementing the apparatus shown.

With respect to FIG. 9 an example electronic device which may be used as the analysis or synthesis device is shown. The device may be any suitable electronics device or apparatus. For example, in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore, in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the signals and in some embodiments determine the parameters as described herein by using the processor 1407 executing suitable code. Furthermore the device may generate a suitable downmix signal and parameter output to be transmitted to the synthesis device.

In some embodiments the device 1400 may be employed as at least part of the synthesis device. As such the input/output port 1409 may be configured to receive the signals and in some embodiments the parameters determined at the capture device or processing device as described herein, and generate a suitable audio signal format output by using the processor 1407 executing suitable code. The input/output port 1409 may be coupled to any suitable audio output for example to a multichannel speaker system and/or headphones or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs can automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus for spatial audio signal encoding comprising at least one processor and at least one memory including computer program code, the at least one memory and the computer program code configured to, with the at least one processor, cause the apparatus to:

obtain, for a first frame, a plurality of audio direction parameters, wherein each parameter comprises an elevation value and an azimuth value and wherein each parameter has an ordered position;

determine whether, for a preceding frame, any of the plurality of audio direction parameters was differentially encoded based on a difference between the preceding frame parameter elevation value and a further preceding frame parameter elevation value and the preceding frame parameter azimuth value and a further preceding frame parameter azimuth value;

generate, for any audio direction parameter which was not differentially encoded in the considered preceding frame, a differential parameter value based on a difference between the frame parameter elevation value and a preceding frame parameter elevation value and a difference between the frame parameter azimuth value and a preceding frame parameter azimuth value;

generate for each of the plurality of audio direction parameters a difference parameter value based on a difference between the audio direction parameter and a rotated derived audio direction parameter;

quantize the difference between the audio direction parameter and a rotated derived audio direction parameter and the differential parameter value; and select for each of the plurality of audio direction parameters, either of the quantized difference or differential parameter value.

2. The apparatus for spatial audio signal encoding as claimed in claim 1 wherein, the apparatus caused to generate for each of the plurality of audio direction parameters a difference parameter value based on a difference between the audio direction parameter and a rotated derived audio direction parameter is caused to:

derive for each of the plurality of audio direction parameters a corresponding derived audio direction parameter comprising an elevation and an azimuth value;

rotate each derived audio direction parameter by the azimuth value of an audio direction parameter in the first position of the plurality of audio direction parameters and quantizing the rotation to determine for each a corresponding quantized rotated derived audio direction parameter; and change the ordered position of an audio direction parameter to a further position coinciding with a position of a rotated derived audio direction parameter when the azimuth value of the audio direction parameter is closest to the azimuth value of the further rotated derived audio direction parameter compared to the azimuth values of other rotated derived audio direction parameters, followed by determining for each of the plurality audio direction parameters a difference between each audio direction parameter and their corresponding quantized rotated derived audio direction parameter.

3. The apparatus for spatial audio signal encoding, as claimed in claim 2, wherein the apparatus caused to deriving for each of the plurality of audio direction parameters a corresponding derived audio direction parameter comprising an elevation and an azimuth value is caused to deriving the azimuth value of each derived audio direction parameter corresponds with a position of a plurality of positions around the circumference of a circle.

4. The apparatus for spatial audio signal encoding, as claimed in claim 2, wherein the plurality of positions around the circumference of the circle are evenly distributed along one of:

360 degrees of the circle when the spatial utilization defined by the elevation values and the azimuth values of the plurality of audio direction parameters occupy more than a hemisphere;

180 degrees of the circle when the spatial utilization defined by the elevation values and the azimuth values of the plurality of audio direction parameters occupy less than a hemisphere;

90 degrees of the circle when the spatial utilization defined by the elevation values and the azimuth values of the plurality of audio direction parameters occupy less than a quadrant of a sphere; and a defined number of degrees of the circle when the spatial utilization defined by the elevation values and the azimuth values of the plurality of audio direction parameters occupy less than a threshold range of angles of a sphere.

5. The apparatus for spatial audio signal encoding, as claimed in claim 4 wherein the number of positions around a circumference of the circle is determined by a determined number of audio direction parameters.

6. The apparatus for spatial audio signal encoding as claimed in claim 2, wherein the corresponding derived audio direction parameters are arranged in a manner determined by a spatial utilization defined by the elevation values and the azimuth values of the plurality of audio direction parameters.

7. The apparatus for spatial audio signal encoding as claimed in claim 1, wherein the apparatus caused to quantize the difference between the audio direction parameter and a rotated derived audio direction parameter and the differential parameter value is caused to determine a difference quantization resolution for each of the plurality of audio direction parameters based on a spatial extent of the audio direction parameters.

8. The apparatus for spatial audio signal encoding as claimed in claim 1, wherein determining whether, for a preceding frame, any of the plurality of audio direction parameters were differentially encoded comprises determining any of the plurality of audio direction parameters were differentially encoded for a determined number of contiguous preceding frames.

9. The apparatus for spatial audio signal encoding as claimed in any of claim 1, wherein the apparatus caused to generate, for any audio direction parameter which was not differentially encoded in the preceding frame, a differential parameter value is at least one of caused to:

generate an indicator based on determining a difference between the frame parameter elevation value and a preceding frame parameter elevation value is less than a determined elevation difference threshold and a difference between the frame parameter azimuth value and a preceding frame parameter azimuth value is less than a determined azimuth difference threshold;

generate an indicator based on determining a difference between the frame parameter elevation value and a preceding frame parameter elevation value is less than a determined elevation difference threshold and a difference between the frame parameter elevation value and a preceding frame parameter elevation value is less than a determined elevation difference threshold;

generate, for any audio direction parameter which was not differentially encoded in the considered preceding frame, a differential parameter value based on a difference between the frame parameter elevation value and a preceding frame parameter elevation value and a difference between the frame parameter azimuth value and a preceding frame parameter azimuth value, when a difference between the frame parameter azimuth value and a preceding frame parameter azimuth value is less than a determined azimuth difference threshold; and generate, for any audio direction parameter which was not differentially encoded in the considered preceding frame, a differential parameter value based on a difference between the frame parameter elevation value and a preceding frame parameter elevation value and a difference between the frame parameter azimuth value and a preceding frame parameter azimuth value, when a difference between the frame parameter elevation value and a preceding frame parameter elevation value is less than a determined elevation difference threshold.

10. The apparatus for spatial audio signal encoding as claimed in claim 1, wherein the apparatus caused to select for each of the plurality of audio direction parameters, either of the quantized difference or differential parameter value is based on a determination of which requires a fewer number of bits to encode where there are both the quantized difference and the differential parameter value for the audio direction parameter and the quantized difference otherwise.

11. The apparatus for spatial audio signal encoding, as claimed in claim 2, wherein the apparatus caused to rotate each derived audio direction parameter by the azimuth value of a first audio direction parameter of the plurality of audio direction parameters is caused to:

add the azimuth value of the first audio direction parameter to the azimuth value of each derived audio direction parameter, wherein the elevation value of each derived audio direction parameter is set to zero.

12. The apparatus for spatial audio signal encoding, as claimed in claim 2, wherein the apparatus caused to quantize the difference between the audio direction parameter and a rotated derived audio direction parameter and the differential parameter value is further caused to scalar quantise the azimuth value of the first audio direction parameter, and the apparatus is further caused to index the positions of the audio direction parameters after the changing by assigning an index to a permutation of indices representing the order of the positions of the audio direction parameters.

13. The apparatus for spatial audio signal encoding as claimed in claim 2, wherein the apparatus caused to determine for each of the plurality audio direction parameters a difference between each audio direction parameter and their corresponding quantized rotated derived audio direction parameter is further caused to:

determine for each of the plurality of audio direction parameters a difference audio direction parameter based on at least:

determining a difference between the first positioned audio direction parameter and the first positioned rotated derived audio direction parameter; and/or determining a difference between a further audio direction parameter and a rotated derived audio direction parameter, wherein the position of the further audio direction parameter is unchanged; and/or determining a difference between a yet further audio direction parameter and a rotated derived audio direction parameter wherein the position of the yet further audio direction parameter has been changed to the position of the rotated derived audio direction parameter.

14. The apparatus for spatial audio signal encoding as claimed in claim 2, wherein the apparatus caused to change the position of an audio direction parameter to a further position applies to any audio direction parameter but the first positioned audio direction parameter.

15. The apparatus for spatial audio signal encoding, as claimed in claim 1, wherein the apparatus caused to quantize the difference between the audio direction parameter and a rotated derived audio direction parameter and the differential parameter value is caused to quantise the difference and the differential parameter value as a vector being indexed to a codebook comprising a plurality of indexed elevation values and indexed azimuth values.

16. The apparatus for spatial audio signal encoding, as claimed in claim 15, wherein the plurality of indexed elevation values and indexed azimuth values are points on a grid arranged in a form of a sphere, wherein the spherical grid is formed by covering the sphere with smaller spheres, wherein the smaller spheres define points of the spherical grid.

17. An apparatus for spatial audio signal decoding comprising at least one processor and at least one memory including computer program code, the at least one memory and the computer program code configured to, with the at least one processor, cause the apparatus to:

obtain, for a first frame, a plurality of encoded audio direction parameters and associated signalling;

determine whether any of the plurality of encoded audio direction parameters are differentially encoded based on a preceding obtained frame encoded audio direction parameter;

decode the determined differentially encoded audio direction parameters based on associated preceding obtained frame encoded audio direction parameters and decoded indicators;

decode the remaining encoded audio direction parameters based on a determined configuration of directional values, of which the configuration is rotated, and at least one directional difference value modifies at least one element thereof; and reorder the differentially decoded and configuration decoded directional values based on the associated signalling.

18. The apparatus for spatial audio signal decoding as claimed in claim 17, wherein the apparatus caused to decode the remaining encoded audio direction parameters based on a determined configuration of directional values, of which the configuration is rotated, and at least one directional difference value modifies at least one element thereof is caused to:

determine a configuration of directional values based on an encoded space utilization parameter within the associated signalling;

determine a rotation angle based on an encoded rotation parameter within the associated signalling;

apply the rotation angle to the configuration of directional values to generate a rotated configuration of directional values, the rotated configuration of directional values comprising a first directional value and second and further directional values;

determine one or more difference values based on encoded difference values and encoded spatial extent values; and apply the one or more difference values to respective second and further respective directional values to generate modified second and further directional values.

19. The apparatus for spatial audio signal decoding, as claimed in claim 18, wherein the apparatus caused to determine a configuration of directional values based on an encoded space utilization parameter within the associated signalling comprises deriving the azimuth value of each derived audio direction parameter corresponds with a position of a plurality of positions around the circumference of a circle.

20. The apparatus for spatial audio signal decoding, as claimed in claim 18, wherein the plurality of positions around the circumference of the circle are evenly distributed along one of:

360 degrees of the circle when the spatial utilization defined by the elevation values and the azimuth values of the plurality of audio direction parameters occupy more than a hemisphere;

180 degrees of the circle when the spatial utilization defined by the elevation values and the azimuth values of the plurality of audio direction parameters occupy less than a hemisphere;

90 degrees of the circle when the spatial utilization defined by the elevation values and the azimuth values of the plurality of audio direction parameters occupy less than a quadrant of a sphere; and a defined number of degrees of the circle when the spatial utilization defined by the elevation values and the azimuth values of the plurality of audio direction parameters occupy less than a threshold range of angles of a sphere.

* * * * *